US 6,624,916 B1
(12) United States Patent
Green et al.

(10) Patent No.: US 6,624,916 B1
(45) Date of Patent: Sep. 23, 2003

(54) SIGNALLING SYSTEM

(75) Inventors: Alan E. Green, Harston (GB); Euan Morrison, Harston (GB); Robert M. Pettigrew, Harston (GB)

(73) Assignee: Quantumbeam Limited, Ickleton (GB)

( * ) Notice: Subject to any disclaimer, the term of this patent is extended or adjusted under 35 U.S.C. 154(b) by 0 days.

(21) Appl. No.: 09/367,223

(22) PCT Filed: Feb. 11, 1998

(86) PCT No.: PCT/GB98/00421

§ 371 (c)(1),
(2), (4) Date: Aug. 11, 1999

(87) PCT Pub. No.: WO98/35328

PCT Pub. Date: Aug. 13, 1998

(30) Foreign Application Priority Data

Feb. 11, 1997 (GB) .............................. 9702726
Mar. 24, 1997 (GB) .............................. 9706062

(51) Int. Cl.⁷ .............................. H04B 10/00
(52) U.S. Cl. .................. 359/169; 359/159; 359/170; 359/181
(58) Field of Search ................ 359/169, 170, 359/181, 515, 172, 159

(56) References Cited

U.S. PATENT DOCUMENTS

| | | | |
|---|---|---|---|
| 3,989,942 A | 11/1976 | Waddoups | 359/170 |
| 4,064,434 A | 12/1977 | Waksberg | 359/170 |
| 4,096,380 A | * 6/1978 | Eichweber | 359/170 X |
| 4,099,050 A | 7/1978 | Sauermann | 359/169 |
| 4,131,791 A | 12/1978 | Lego, Jr. | 359/169 |
| 4,143,263 A | 3/1979 | Eichweber | 359/170 |
| 4,325,146 A | 4/1982 | Lennington | |
| 4,361,911 A | 11/1982 | Buser et al. | 359/169 |
| 4,364,631 A | 12/1982 | Arondel et al. | 359/366 |
| 4,456,793 A | 6/1984 | Baker et al. | |

(List continued on next page.)

FOREIGN PATENT DOCUMENTS

| | | |
|---|---|---|
| DE | 19702634 A1 | 7/1998 |
| EP | 0 503 874 | 9/1992 |
| EP | 749219 A2 | 12/1996 |
| EP | 0 813 040 | 12/1997 |
| EP | 0 813 073 | 12/1997 |
| EP | 859478 A2 | 8/1998 |
| GB | 1032529 | 6/1966 |
| GB | 1529388 | 10/1978 |
| GB | 2 099 992 | 12/1982 |
| GB | 2125647 A | 3/1984 |

(List continued on next page.)

OTHER PUBLICATIONS

Boyd et al., "5.5 GHz Multiple Quantum Well Reflection Modulator," Electronic Letters, vol. 25, No. 9 (Apr. 27, 1989), pp. 558–560.
Wood et al., "High–speed optical modulation with GaAs/GaAIAs quantum wells in a p–i–n diode structure," Appl. Phys. Letters 44(1) (Jan. 1, 1984), pp. 16–18.
Boyd et al., "Multiple quantum well reflection modulator," Appl. Phys. Letters 50 (17) (Apr. 27, 1987), pp. 1119–1121.
Wood et al., "Bidirectional Fibre–optical Transmission Using a Multiple–quantum–well (MQW) Modulator Detector," Electronic Letters, vol. 22, No. 10 (May 8, 1986), pp. 528–529.

(List continued on next page.)

Primary Examiner—Thomas Mullen
(74) Attorney, Agent, or Firm—Nixon & Vanderhye PC

(57) ABSTRACT

A signalling system includes first and second signalling devices. The first signalling device including a retro-reflector modulator, having a lens, a modulator and a reflector, and being operable to receive, modulate and reflect the modulated signal back to the second signalling device. The second signalling device including a signal generator, a receiver for receiving the modulated signal from the first signalling device and a processor for retrieving modulation data from the received modulated signal. The lens of the first signalling device includes a telecentric lens.

109 Claims, 16 Drawing Sheets

U.S. PATENT DOCUMENTS

| | | | |
|---|---|---|---|
| 4,570,062 A | | 2/1986 | Tsumura et al. ......... 359/168 X |
| 4,717,913 A | | 1/1988 | Elger ......................... 340/10.1 |
| 4,727,593 A | * | 2/1988 | Goldstein ............... 359/169 X |
| 4,727,600 A | | 2/1988 | Avakian |
| 4,740,708 A | * | 4/1988 | Batchelder .................. 250/563 |
| 4,809,257 A | | 2/1989 | Gantenbein et al. |
| 4,864,651 A | | 9/1989 | Ogiwara et al. ............ 359/189 |
| 4,882,770 A | | 11/1989 | Miyahira et al. |
| 4,888,816 A | | 12/1989 | Sica, Jr. |
| 4,933,928 A | | 6/1990 | Grant et al. |
| 4,941,205 A | | 7/1990 | Horst et al. .................. 359/170 |
| 4,959,874 A | | 9/1990 | Saruta et al. |
| 4,982,445 A | | 1/1991 | Grant et al. |
| 4,983,021 A | | 1/1991 | Fergason ................ 359/238 X |
| 5,062,150 A | | 10/1991 | Swanson et al. |
| 5,091,636 A | | 2/1992 | Takada et al. .............. 235/454 |
| 5,099,346 A | | 3/1992 | Lee et al. |
| 5,117,301 A | | 5/1992 | Tsumura ..................... 359/154 |
| 5,121,242 A | | 6/1992 | Kennedy .................... 359/152 |
| 5,121,243 A | | 6/1992 | Miyahira et al. ........... 359/158 |
| 5,126,879 A | | 6/1992 | Ulbers ........................ 359/534 |
| 5,142,399 A | | 8/1992 | Bertrand et al. ............ 359/154 |
| 5,218,356 A | | 6/1993 | Knapp |
| 5,229,593 A | | 7/1993 | Cato ...................... 359/110 X |
| 5,230,005 A | * | 7/1993 | Rubino et al. ................ 372/20 |
| 5,247,381 A | | 9/1993 | Olmstead et al. |
| 5,289,306 A | | 2/1994 | Hirohashi et al. |
| 5,315,645 A | | 5/1994 | Matheny |
| 5,317,442 A | | 5/1994 | Sharp et al. |
| 5,329,395 A | | 7/1994 | Endo et al. ................. 359/159 |
| 5,349,463 A | | 9/1994 | Hirohashi et al. |
| 5,359,446 A | | 10/1994 | Johnson et al. |
| 5,408,350 A | | 4/1995 | Perrier et al. ............... 359/168 |
| 5,475,520 A | | 12/1995 | Wissinger |
| 5,493,436 A | | 2/1996 | Karasawa et al. .......... 359/145 |
| 5,517,016 A | | 5/1996 | Lesh et al. |
| 5,559,624 A | | 9/1996 | Darcie et al. ............... 359/125 |
| 5,627,669 A | | 5/1997 | Orino et al. |
| 5,659,413 A | | 8/1997 | Carlson |
| 5,710,671 A | | 1/1998 | Bichlmaier |
| 5,736,730 A | | 4/1998 | Nicole |
| 5,777,768 A | | 7/1998 | Korevaar ..................... 359/172 |
| 5,786,923 A | | 7/1998 | Doucet et al. .............. 359/172 |
| 5,818,619 A | | 10/1998 | Medved et al. |
| 5,819,164 A | | 10/1998 | Sun et al. |
| 5,822,099 A | | 10/1998 | Takamatsu .................. 359/153 |
| 5,880,867 A | | 3/1999 | Ronald |
| 5,953,146 A | | 9/1999 | Shelby ........................ 359/159 |
| 5,969,842 A | | 10/1999 | Crimmins et al. |
| 5,973,310 A | | 10/1999 | Lunscher |
| 6,014,478 A | | 1/2000 | Spaeth .......................... 385/18 |
| 6,076,939 A | | 6/2000 | Czichy et al. |
| 6,104,512 A | | 8/2000 | Batey, Jr. et al. |
| 6,154,299 A | | 11/2000 | Gilbreath et al. ........... 359/170 |
| 6,256,129 B1 | | 7/2001 | Kim et al. |
| 6,285,481 B1 | | 9/2001 | Palmer |
| 6,301,307 B1 | | 10/2001 | Le Dantec et al. |
| 6,310,707 B1 | | 10/2001 | Kawase et al. |
| 6,314,163 B1 | | 11/2001 | Acampora |
| 6,353,491 B1 | | 3/2002 | Tanaka et al. |

FOREIGN PATENT DOCUMENTS

| | | |
|---|---|---|
| GB | 2 186 457 | 8/1987 |
| GB | 2196809 A | 5/1988 |
| GB | 2215089 | 9/1989 |
| GB | 2221810 A | 2/1990 |
| GB | 2222335 | 2/1990 |
| GB | 2226729 A | 7/1990 |
| GB | 2240681 A | 8/1991 |
| GB | 2245116 A | 12/1991 |
| WO | WO 86/03637 | 6/1986 |
| WO | WO91/09477 | 6/1991 |
| WO | WO95/15624 | 6/1995 |
| WO | WO 98/57451 | 12/1998 |

OTHER PUBLICATIONS

Miller, D.A.B., "Quantum–well self–electro–optic effect devices," *Optical & Quantum Electronics* 22 (1990), pp. S61–S98.

Rosenthal, "Retroreflecting passive data transmitter", *Navy Technical Disclosure Bulletin*, vol. 10, No. 1, Sep. 1984, pp. 107–111.

Smyth et al, "Optical Wireless—A Prognosis", *SPIE*, vol. 2601, 1965, pp. 212–225.

"Fiber–free laser communication finds niche in commercial market", *Optics & Photonics News*, Jul. 1997.

Recent Press Releases: "Silicon Light Machines Spearheads Development of Next–Generation Display Technology", Sunnyvale, California, Sep. 23, 1996, three pages; "The Grating Light Valve Technology", one page.

Two page website printout "AT&T Custom Seed Designs," Consortium for Optical and Optoelectronic Technologies in Computing.

Two page website printout "AT&T Electrically Controlled Seed," Consortium for Optical and Optoelectronic Technologies in Computing.

Two page website printout "AT&T Seed Modulators," Consortium for Optical and Optoelectronic Technologies in Computing.

Two page website printout "AT&T S–Seed Arrays," Consortium for Optical and Optoelectronic Technologies in Computing.

Three pages website printouts "AT&T S–Seed Devices," Consortium for Optical and Optoelectronic Technologies in Computing.

Five pages website printouts "Laser Communications, Inc."

Two page website printout "Optical Modulators".

* cited by examiner

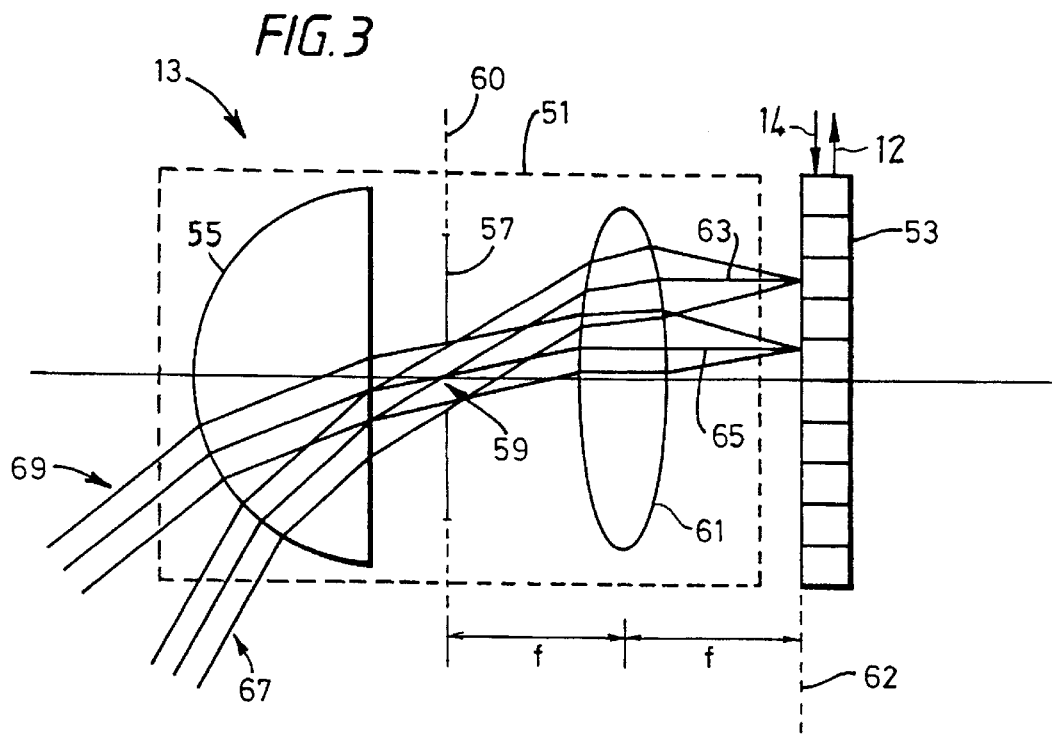
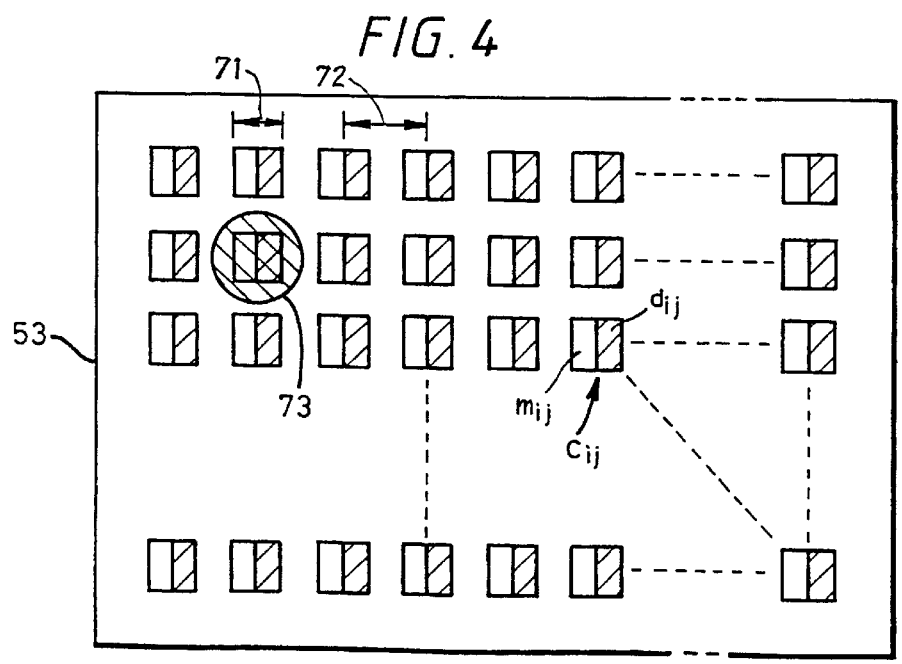

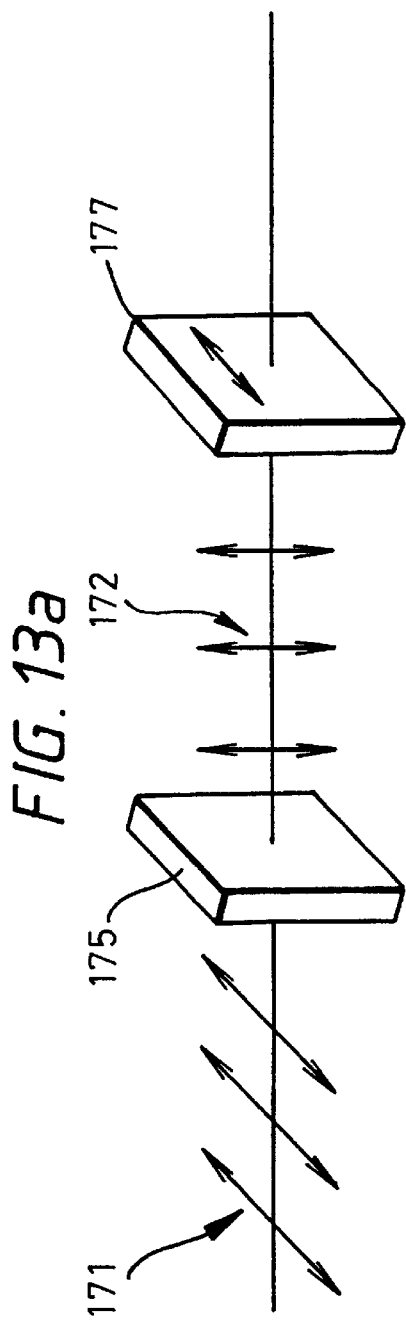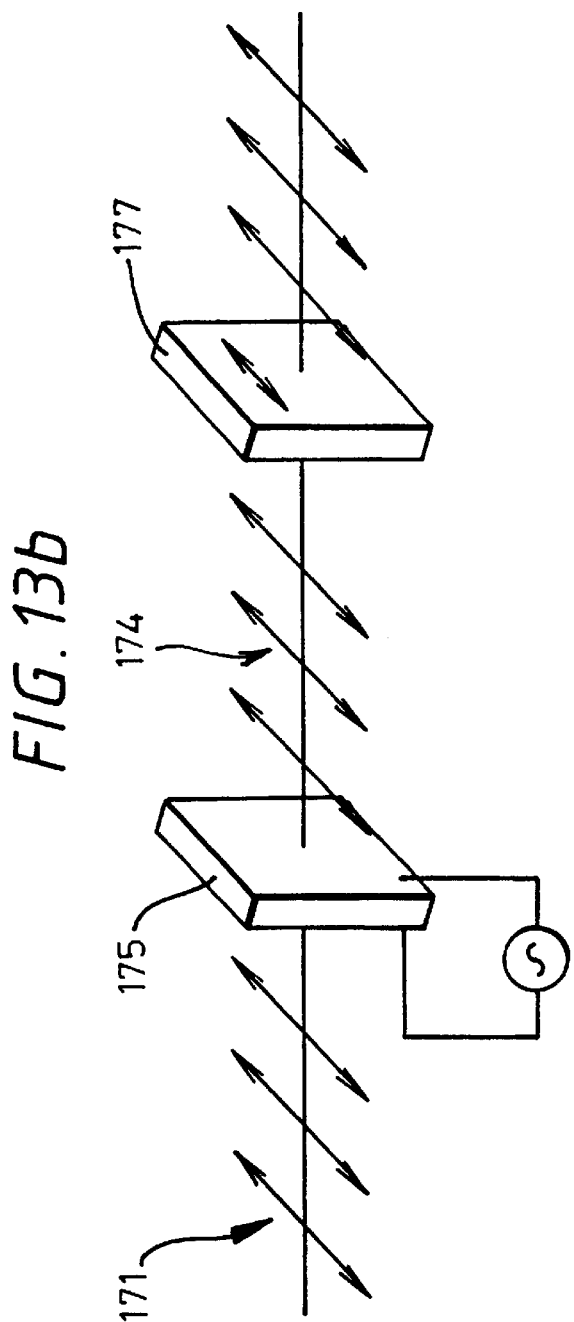

SIGNALLING SYSTEM

FIELD OF THE INVENTION

The present invention relates to a signalling system. One aspect of the present invention relates to a free space point to multipoint signalling method and apparatus. Another aspect of the invention relates to a retro-reflector for use in a signalling system. According to a further aspect, the present invention relates to a multipoint to point signalling system.

BACKGROUND OF THE INVENTION

There are a number of existing systems which allow point to multipoint communications. For example, there are existing radio and microwave broadcast systems in which messages are broadcast as radio/microwave signals from a central transmitter to a plurality of remote receivers. However, there are a number of disadvantages with this kind of broadcasting system. One disadvantage is that a large amount of the transmitted power is wasted due to the inevitable broadcasting of the signals into regions where there are no receivers. Another problem with this kind of broadcast system is that there is limited bandwidth (a few Megahertz for radio frequencies and up to one hundred Megahertz for microwave frequencies). Another problem with this kind of broadcast system is that it is subject to regulatory requirements. In particular, the transmission of signals in radio and microwave frequency bands is strictly controlled, with users being required to obtain a licence in order to broadcast.

Another type of known point to multipoint communications system employs cables (optical and/or electrical) and taps/junctions through which communications from a transmitter are passed to multiple receivers. However, these cable systems can be expensive, due to the cost of the cable itself and its installation, and is not suitable in some situations. In particular, although it may be practical to install cable along most streets, it may not be practical to install the cable from the street into every home and office along the side of the street. Cable systems are also not practical in temporary systems where a short term communications link is required.

Another type of known point to multipoint communication system is an optical broadcast system, in which the messages are broadcast as optical signals from an optical transmitter to a plurality of remote optical receivers. However, as with the radio and microwave broadcast systems, such an optical broadcast system suffers from the disadvantage that a large amount of the transmitted power is wasted due to the broadcasting of the signals into areas where there are no receivers. Additionally, since the power of the transmitted laser beam must meet eye-safety requirements, present systems can only broadcast over short distances of about a few metres.

SUMMARY OF THE INVENTION

According to one aspect, the present invention provides an alternative point to multipoint signalling system.

According to this aspect, the present invention provides a point to multipoint signalling system, comprising a first signalling device and a plurality of second signalling devices, wherein the first signalling device comprises: means for receiving signals transmitted from the plurality of second signalling devices, means for modulating the received signals with respective modulation data for the second signalling devices and means for reflecting the modulated signals back to the respective second signalling devices, and wherein each second signalling device comprises: means for generating a signal, means for transmitting the generated signal to said first signalling device, means for receiving the modulated signal which is reflected back from said first signalling device, and means for retrieving the modulation data from the reflected signal.

The present invention also relates to a retro-reflector for use in a signalling system. Optical retro-ref lectors are commonly used in a wide variety of applications from precision metrology to "cats-eye" road markers. The main function of the retro-reflector is to reflect incident light back towards the source. There are currently three different types of optical retro-reflectors commonly in use, namely the spherical reflector, the corner cube reflector and the plane mirror.

Plane mirrors are only effective as optical retro-reflecting elements when they are carefully aligned with the source, so that the reflective surface is orthogonal to the direction of travel of the light emitted from the source.

Corner cube reflectors typically comprise an arrangement of three mutually perpendicular mirrors. Alternatively, they can be constructed from a glass prism with three mutually perpendicular reflecting surfaces formed by the faces of the prism. Light incident on such a corner cube reflector is reflected from all three surfaces and travels back towards the source parallel to its original path. Typically these corner cube reflectors have acceptance angles (i.e. a field of view) of +/−30°, thereby eliminating the need for precise angular alignment with the source.

There are several different forms of spherical retro-reflectors. The most common comprises a relatively high reflective index sphere which focuses the incident light on the rear surface of the sphere (which can be coated with a reflective coating) where it is reflected back along its original path. This is the basis of the "cats-eye" type reflectors commonly used for road markings. Other types of spherical retro-reflectors comprise of one or more concentric spheres of differing refractive index or reflectivity, with the reflection occurring at the surface of the concentric spheres.

A second aspect of the present invention aims to provide an alternative type of retro-reflector.

According to this aspect, the present invention provides a retro-reflector comprising: a focusing member, having first and second focal planes, for focusing signals received from a source, a stop member, located substantially at said first focal plane, for blocking part of the received signals from said focusing member and a reflecting member, located substantially at said second focal plane, for reflecting said signal back to said source.

The second aspect of the invention also provides a retro-reflector comprising a telecentric lens for receiving and focusing light from a light source and a reflecting means located substantially at the focal plane of said telecentric lens for reflecting said light back to said light source.

A third aspect of the present invention aims to provide an alternative type of multipoint to point signalling system.

According to this third aspect, the present invention provides a multipoint to point signalling system, comprising a first signalling device and a plurality of second signalling devices located at preselected locations with respect to said first signalling device, wherein each second signalling device comprises: at least one sensor input terminal operable to receive a signal from a sensor and a light source operable to generate a light beam in dependence upon said sensor signal for transmission to said first signalling device and wherein said first signalling device comprises: a plurality of light detectors for detecting light transmitted from the plurality of second signalling devices and means for focusing the light transmitted from each second signalling device onto a respective light detector.

BRIEF DESCRIPTION OF THE DRAWINGS

Exemplary embodiments of the present invention will now be described with reference to the accompanying drawings in which:

FIG. 3 is a schematic diagram of a retro-reflecting modulator unit employed in the local distribution node shown in FIG. 2;

FIG. 4 is a schematic diagram of a pixellated modulator forming part of the retro-reflecting modulator unit shown in FIG. 3;

FIG. 13a illustrates the operation of a liquid crystal modulator with no bias potential applied to electrodes thereof;

FIG. 13b illustrates the operation of a liquid crystal modulator with an alternating bias potential applied to the electrodes thereof;

FIG. 14b is a perspective view of the retro-reflecting modulator shown in FIG. 14a;

FIG. 15b is a signal diagram which illustrates a first mode of operation of the modulator shown in FIG. 15a;

FIG. 15c is a signal diagram illustrating a second mode of operation of the modulator shown in FIG. 15a;

FIG. 16b is a signal diagram illustrating the way in which phase and frequency modulation is achieved by the modulator shown in FIG. 16a;

DETAILED DESCRIPTION OF THE INVENTION

Figure 1:
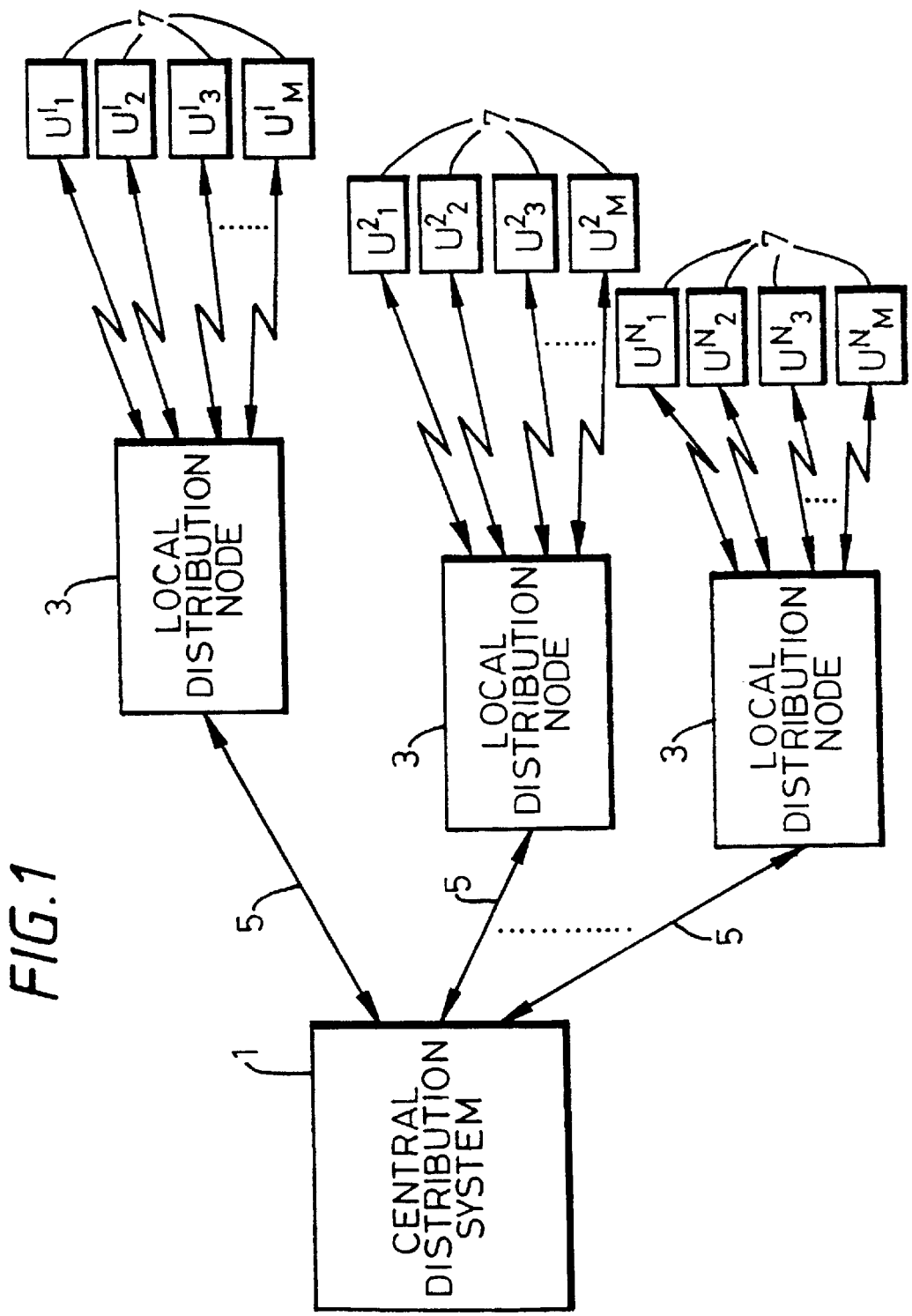
FIG. 1 is a schematic block diagram of a video data point to multipoint communication system.

FIG. 1 schematically illustrates a video broadcast system for supplying video signals, for a plurality of television channels, to a plurality of remote users. As shown in FIG. 1, the system comprises a central distribution system 1 which transmits optical video signals to a plurality of local distribution nodes 3 via a bundle of optical fibres 5. The local distribution nodes 3 are arranged to receive the optical video signals transmitted from the central distribution system 1 and to transmit relevant parts of the video signals to respective user terminals 7 (which are spatially fixed relative to the local distribution node 3) as optical signals through free space, i.e. not as optical signals along an optical fibre path.

In this embodiment, the video data for all the available television channels is transmitted from the central distribution system I to each of the local distribution nodes 3, each user terminal 7 informs the appropriate local distribution node 3 which channel or channels it wishes to receive (by transmitting an appropriate request) and, in response, the local distribution node 3 transmits the appropriate video data, to the respective user terminals 7. Each local distribution node 3 does not, however, broadcast the video data to the respective user terminals 7. Instead, each local distribution node 3 is arranged (i) to receive an optical beam transmitted from each of the user terminals 7 which are in its locality, (ii) to modulate the received beams with the appropriate video data for the desired channel or channels, and (iii) to reflect the modulated beams back to the respective user terminals 7. In addition to being able to receive optical signals from the central distribution system 1 and from the user terminal 7, each of the local distribution nodes 3 can also transmit optical data, such as status reports, back to the central distribution system 1 via the respective optical fibre bundle 5, so that the central distribution system 1 can monitor the status of the distribution network.

Figure 2:
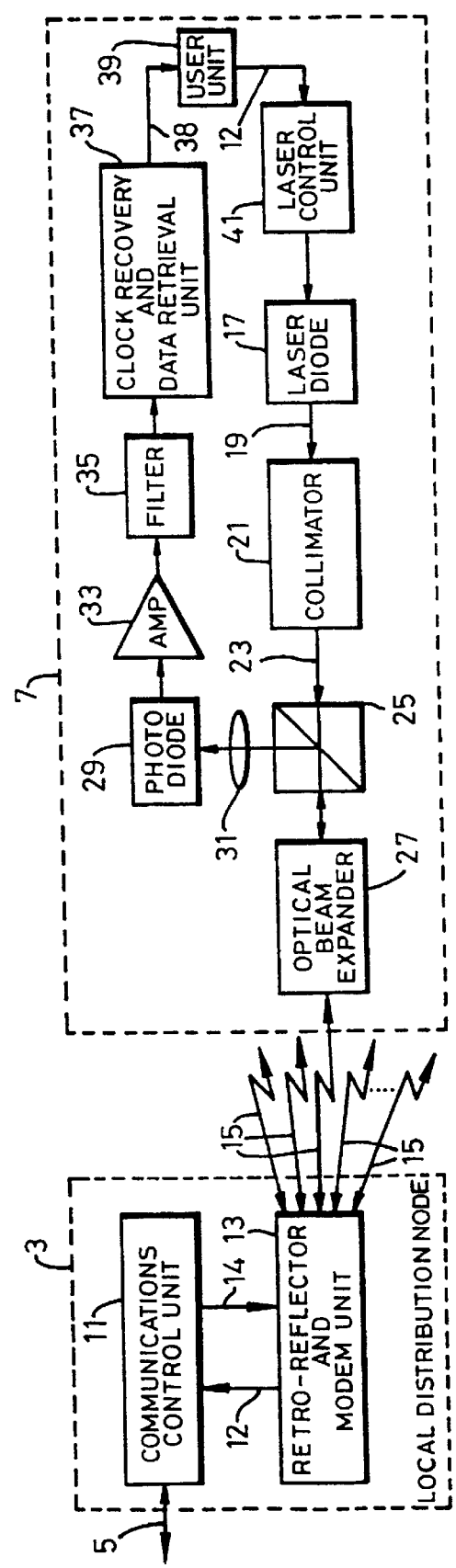
FIG. 2 is a schematic block diagram of a local distribution node and a user terminal forming part of the video and data communication system shown in FIG. 1.

FIG. 2 schematically illustrates in more detail the main components of one of the local distribution nodes 3 and one of the user terminals 7 of the system shown in FIG. 1. As shown in FIG. 2, the local distribution node 3 comprises a communications control unit 11 which (i) receives the optical signals transmitted along the optical fibre bundle 5 from the central distribution system 1; (ii) regenerates the video data from the received optical signals; (iii) receives messages 12 transmitted from the user terminals 7 and takes appropriate action in response thereto; and (iv) converts the appropriate video data into data 14 for modulating the respective light beams 15 received from the user terminals 7. In converting the video data into modulation data 14, the communications control unit 11 will encode the video data with error correction coding and coding to reduce the effects of inter-symbol-interference and other kinds of well known sources of interference such as from the sun and other light sources.

The local distribution node 3 also comprises a retro-reflector and modem unit 13, which is arranged to receive the optical beams 15 from the user terminals 7 which are within its field of view, to modulate the respective light beams with the appropriate modulation data 14 and to reflect the modulated beams back to the respective user terminals 7. In the event that an optical beam 15 received from one of the user terminals 7 carries a message 12, then the retro-reflector and modem unit 13 retrieves the message 12 and sends it to the communications control unit 11 where it is processed and the appropriate action is taken. In this embodiment, the retro-reflector and modem unit 13 has a horizontal field of view which is greater than +/−50° and a vertical field of view of approximately +/−5°.

FIG. 2 also shows the main components of one of the user terminals 7. As shown, the user terminal 7 comprises a laser diode 17 for outputting a laser beam 19 of coherent light. In this embodiment, the user terminals 7 are designed so that they can communicate with the local distribution node 3 within a range of 150 metres with a link availability of 99.9 per cent. To achieve this, the laser diode 17 is a 50 mW laser diode which outputs a laser beam having a wavelength of 850 nm. This output laser beam 19 is passed through a collimator 21 which reduces the angle of divergence of the laser beam 19. The resulting laser beam 23 is passed through a beam splitter 25 to an optical beam expander 27, which increases the diameter of the laser beam for transmittal to the retro-reflector and modem unit 13 located in the local distribution node 3. The optical beam expander 27 is used because a large diameter laser beam has a smaller divergence than a small diameter laser beam. Additionally, increasing the diameter of the laser beam also has the advantage of spreading the power of the laser beam over a larger area. Therefore, it is possible to use a higher powered laser diode 17 whilst still meeting eye-safety requirements.

Using the optical beam expander 27 has the further advantage that it provides a fairly large collecting aperture for the reflected laser beam and it concentrates the reflected laser beam into a smaller diameter beam. The smaller diameter reflected beam is then split from the path of the originally transmitted laser beam by the beam splitter 25 and focused onto a photo-diode 29 by a lens 31. Since the operating wavelength of the laser diode 17 is 850 nm, a silicon avalanche photo-diode (APD) can be used, which is generally more sensitive than other commercially available photo detectors, because of the low noise multiplication which can be achieved with these devices. The electrical signals output by the photo-diode 29, which will vary in dependence upon the modulation data 14, are then amplified by the amplifier 33 and filtered by the filter 35. The filtered signals are then supplied to a clock recovery and data retrieval unit 37 which regenerates the clock and the video data using standard data processing techniques. The retrieved video data 38 is then passed to the user unit 39, which, in this embodiment, comprises a television receiver in which the video data is displayed to the user on a CRT (not shown).

In this embodiment, the user unit 39 can receive an input from the user, for example indicating the selection of a desired television channel, via a remote control unit (not shown). In response, the user unit 39 generates an appropriate message 12 for transmittal to the local distribution node 3. This message 12 is output to a laser control unit 41 which controls the laser diode 17 so as to cause the laser beam 19 output from the laser diode 17 to be modulated with the message 12. As those skilled in art will appreciate, in order that the data being transmitted in opposite directions do not interfere with each other, different modulation techniques should be employed. For example, if the amplitude of the laser beam 15 is modulated by the local distribution node 3, then the laser control unit 41 should modulate, for example, the phase of the transmitted laser beam. Alternatively, the laser control unit 41 could apply a small signal modulation to the laser beam 19 to create a low-bandwidth control channel between the user terminal 7 and the local distribution node 3. This is possible provided the detector in the local distribution node 3 can detect the small variation in the amplitude of the received laser beam. Furthermore, such a small signal amplitude modulation of the laser beam would not affect 5 a binary "on" and "off" type modulation which could be employed by the retro-reflector and modem unit 13.

The structure and function of the components in the user terminal 7 are well known to those skilled in the art and a more detailed description of them shall, therefore, be omitted.

FIG. 3 schematically illustrates the retro-reflector and modem unit 13 which forms part of the local distribution node 3 shown in FIG. 2. As shown, in this embodiment, the retro-reflector and modem unit 13 comprises a wide angle telecentric lens system 51 and an array of modulators and demodulators 53. The design of such a wide angle telecentric lens using fisheye lens techniques is well known to those skilled in the art. In this embodiment, the telecentric lens 51 comprises lens elements 61 and 55 and a stop member 57, having a central aperture 59, which is optically located on the front focal plane 60 of the lens system. The size of the aperture 59 is a design choice and depends upon the particular requirements of the Installation. In particular, a small aperture 59 results in most of the light from the sources being blocked (and hence represents a significant transmission loss of the system) but does not require a large expensive lens to focus the light. In contrast, a large aperture will allow most of the light from the sources to pass through to the lens but requires a larger and hence more expensive lens system 61. However, since the overriding issue with free space optical transmission is atmospheric loss, little is often gained by increasing the size of the aperture 59 beyond a certain amount.

Due to the telecentricity of the telecentric lens 51, the light incident on the lens system 61 is focused at the rear image plane 62 in such a way that the principal rays 63 and 65 which emerge from the lens system 61 are perpendicular to the back focal plane 62. One problem with existing optical modulators is that the efficiency of the modulation, ie the modulation depth, which is performed depends upon the angle with which the laser beam hits the modulator. Therefore, when used with one of the prior art type retro-reflectors described above, the modulation depth depends upon the positions of the user terminals 7 within the retro-reflector's field of view. In contrast, by using a telecentric lens 51 and by placing the modulator and demodulator array at the back focal plane 62 of the telecentric lens 51, the principal rays of the laser beams 15 from the user terminals 7 will all be at 90° to the surface of the modulators, regardless of the positions of the user terminals 7 within the retro-reflector's field of view. Consequently a high efficiency optical modulation can be achieved.

Additionally, as is illustrated by the two sets of rays 67 and 69, laser beams from different sources are focused onto different parts of the array of modulators and demodulators 53. Therefore, by using an array of separate modulators and demodulators, the laser beams 15 from all the user terminals 7 can be separately detected and modulated by a respective modulator and demodulator. FIG. 4 is a schematic representation of the front surface (ie the surface facing the lens system 61) of the modulator and demodulator array 53 which, in this embodiment, comprises one hundred columns of modulator/demodulator cells and ten rows of modulator/demodulator cells (not all of which are shown in the figure). Each modulator/demodulator cell $c_{ij}$ comprises a modulator $m_{ij}$ and a demodulator $d_{ij}$ located adjacent the corresponding modulator. In this embodiment, the size 71 of the cells $c_{ij}$ are between 50 and 200 µm, with the spacing (centre to centre) 72 between the cells being slightly greater than the cell size 71.

The telecentric lens 51 is designed so that the spot size of a focused laser beam from one of the user terminals 7 corresponds with the size 71 of one of the modulator/demodulator cells $c_{ij}$, as illustrated by the shaded circle 73 shown in FIG. 4, which covers the modulator/demodulator cell $c_{22}$. The way in which the laser beams from the user terminals 7 are aligned with the retro-reflector and the way in which the system initially assigns the modulator/demodulator cells to the respective user terminals will be described in more detail later.

Figure 5A:
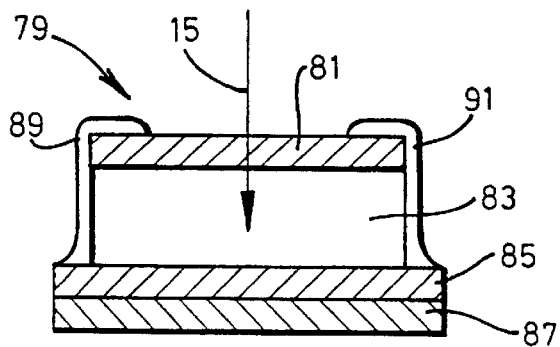
FIG. 5a is a cross sectional view of one modulator of the pixellated modulator shown in FIG. 4 in a first operational mode when no DC bias is applied to electrodes thereof.

In this embodiment, SEED (self-electro-optic effect devices) modulators 79, developed by the American Telephone and Telegraph Company (AT&T), are used for the modulators $m_{ij}$. FIG. 5a schematically illustrates the cross-section of such a SEED modulator 79. As shown, the SEED modulator 79 comprises a transparent window 81 through which the laser beam 15 from the appropriate user terminal 7 can pass, a layer 83 of Gallium Arsenide (GaAs) based material for modulating the laser beam 15, an insulating layer 85, a substrate 87 and a pair of electrodes 89 and 91 located on either side of the modulating layer 83 for applying a DC bias voltage to the modulating material 83.

Figure 5B:
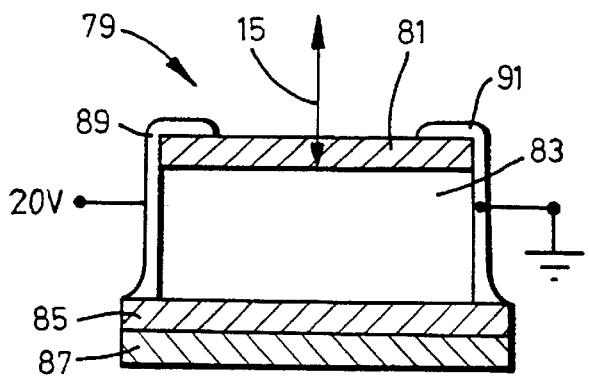
FIG. 5b is a cross sectional view of one modulator of the pixellated modulator shown in FIG. 4 in a second operational mode when a bias voltage is applied to the electrodes.

In operation, the laser beam 15 from the user terminal 7 passes through the window 81 into the modulating layer 83. Depending upon the DC bias voltage applied to the electrodes 89 and 91, the laser beam 15 is either reflected by the modulating layer 83 or it is absorbed by the modulating layer 83. In particular, when no DC bias is applied to the electrodes 89 and 91, as illustrated in FIG. 5a, the laser beam 15 passes through the window 81 and is absorbed by the modulating layer 83. Consequently, when there is no DC bias voltage applied to the electrodes 89 and 91, no light is reflected back to the corresponding user terminal 7. On the other hand, when a DC bias voltage of approximately 20 volts is applied across the electrodes 89 and 91, as illustrated in FIG. 5b, the laser beam 15 from the corresponding user terminal 7 passes through the window 81 and is reflected by the modulating layer 83 back upon itself along the same path to the corresponding user terminal 7.

Figure 6:
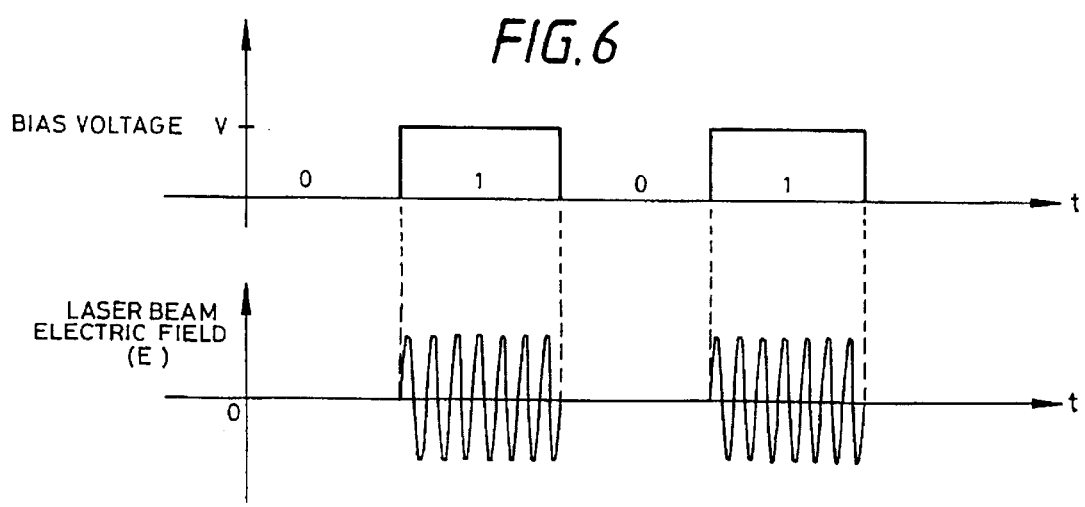
FIG. 6 is a signal diagram which illustrates the way in which light incident on one of the modulators shown in FIG. 4 is modulated in dependence upon the bias voltage applied to the pixel electrodes.

Therefore, by changing the bias voltage applied to the electrodes 89 and 91 in accordance with the modulation data 14 to be transmitted to the user terminal 7, the SEED modulator 79 will amplitude modulate the received laser beam 15 and reflect the modulated beam back to the user terminal 7. In particular, as illustrated in FIG. 6, for a binary zero to be transmitted, a zero voltage bias is applied to the electrodes 89 and 91, resulting in no reflected light, and for a binary one to be transmitted a DC bias voltage of 20 volts is applied across the electrodes 89 and 91, resulting in the laser beam 15 being reflected back from the modulator 79 to the corresponding user terminal 7. Therefore, the light beam which is reflected back to the user terminal 7 is, in effect, being switched on and off in accordance with the modulation data 14. Therefore, by monitoring the amplitude of the signal output by the photo-diode 29 shown in FIG. 2, the corresponding user terminal 7 can detect and recover the modulation data 14 and hence the corresponding video data.

Ideally, the light which is incident on the SEED modulator 79 is either totally absorbed therein or totally reflected thereby. In practice, however, the SEED modulator 79 will reflect typically 5% of the laser beam 15 when no DC bias is applied to the electrodes 89 and 91 and between 20 and 30% of the laser beam 15 when the DC bias is applied to the electrodes 89 and 91. Therefore, in practice, there will only be a difference of about 15 to 25% in the amount of light which is directed onto the photo-diode 29 when a binary zero is being transmitted and when a binary one is being transmitted.

By using the SEED modulators 79, modulation rates of the individual modulator cells $m_{ij}$ as high as 2 Giga bits per second can be achieved. This is more than enough to be able to transmit the video data for the desired channel or channels to the user terminal 7 together with the appropriate error correcting coding and other coding which may be employed to facilitate the recovery of the data clock.

In this embodiment, each of the individual demodulator $d_{ij}$ comprises a photo-diode which is connected to an associated amplifier, filter and clock recovery and data retrieval unit similar to those employed in the user terminal 7 shown in FIG. 2, which operate to detect any modulation of the corresponding laser beam and to regenerate any messages 12 which are transmitted from the corresponding user terminal 7. All the recovered messages 12 are then transmitted back to the communications control unit 11 where they are processed and appropriate actions are taken.

As mentioned above, before a user terminal 7 can communicate with the local distribution node 3, an initialisation procedure must be performed. A brief description of this initialisation procedure will now be given. Upon installation of a new user terminal 7, the installer will manually align the user terminal 7, so that the laser beam will be directed roughly in the direction of the local distribution node 3. The installer will then set the new user terminal 7 into an installation mode in which a laser beam having a wide beamwidth and carrying an initialisation code is output by the new user terminal 7 and directed towards the local distribution node 3. Part of this wide beamwidth laser beam will be received at the local distribution node 3 and will be focused onto an unknown modulator/demodulator cell $c_{ij}$ by the telecentric lens 51. The communications control unit 11 then samples signals from all the unassigned cells until it finds the initialisation code and then assigns that cell to the new user terminal 7 for all future communications. During this initialisation period, the new user terminal 7 will also use the strength of the reflected beam which it receives to control servo motors (not shown) to make fine adjustments in the direction in which the laser beam 15 is being output by the new user terminal 7. After the initialisation has been completed, the new user terminal is set into an operational mode in which a narrow collimated laser beam is produced and transmitted to the local distribution node 3 for receiving the appropriate modulation data 14.

As those skilled in the art will appreciate, the point to multipoint signalling system described above has number of advantages over the prior art point to multipoint signalling systems. These include:

1) The point to multipoint signalling system does not waste optical power by transmitting data into areas where there are no receivers. Additionally, the local distribution nodes 3 effectively only transmit data to those user terminals which are switched on, since a user terminal 7 will not emit a laser beam whilst the corresponding television receiver is switched off.
2) The use of collimated laser beams leads to low transmission losses (which are mainly due to diffraction, the limited collection aperture, modulator losses and atmospheric transmission losses) which allows the use of a low optical power laser diode.
3) A small signal modulation of the collimated laser beam can be used to implement a low-bandwidth control channel from the user terminal 7 to the corresponding local distribution node 3.
4) The optics used in the retro-reflector and modem unit 13 can be designed so that it has a large field of view, since the telecentric lens causes the principal rays from the laser beams to be directed towards the modulator at 90° thereto. Consequently, the problem of angle sensitivity of existing optical modulators can be overcome so that efficient modulation can be achieved.

Figure 7:
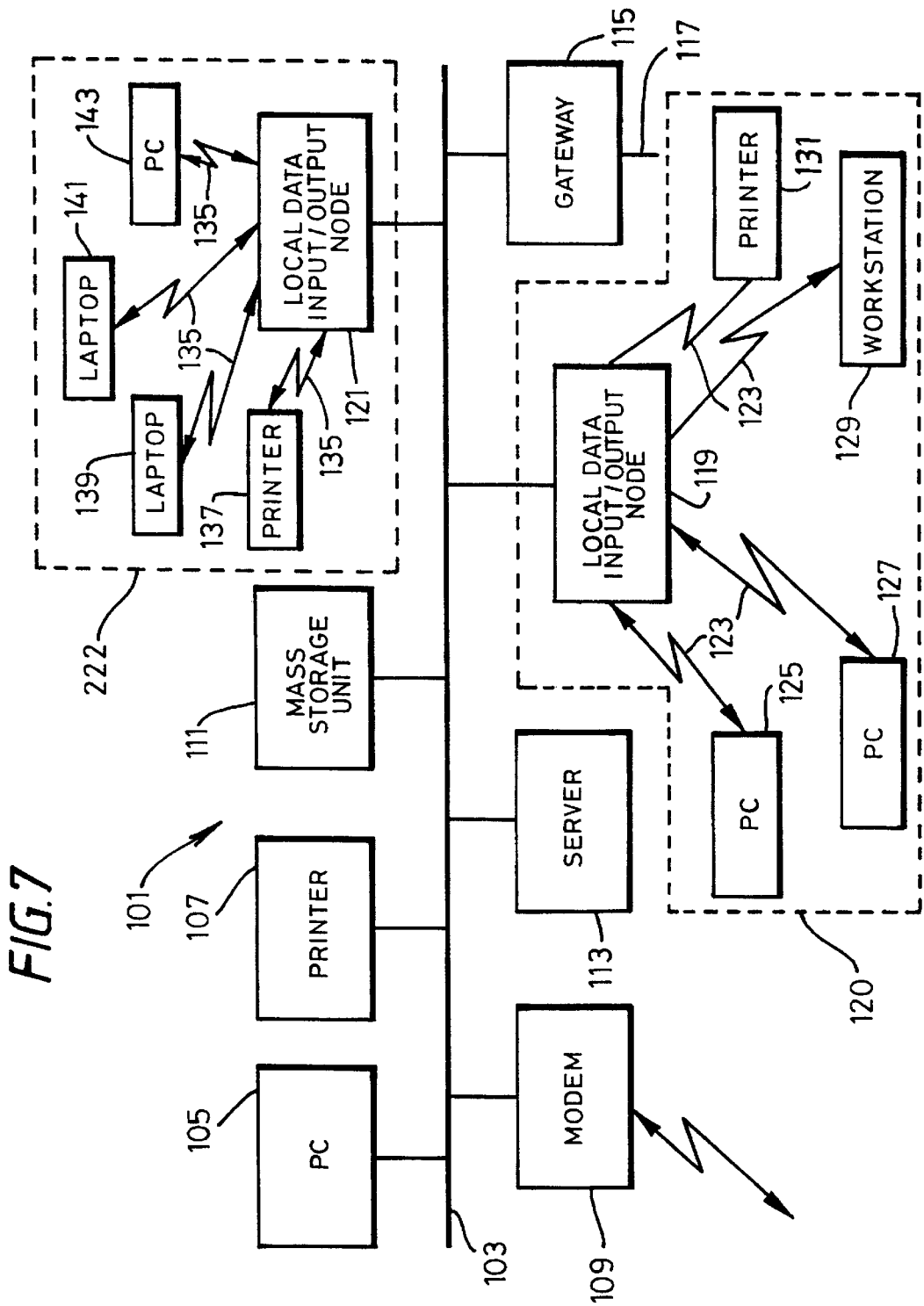
FIG. 7 is a schematic diagram of a local area network employed in an office environment which has two optical point to multipoint signalling systems.

FIG. 7 is a schematic diagram of a local area network 101 employed in an office environment having two point to multipoint signalling systems. As shown, the local area network 101 comprises a data bus 103 which connects together personal computers 105, printers 107, modem units 109 and mass storage units 111 located throughout the office. A server 113 is provided for controlling the use of the network resources and for maintaining a record of the status of the local area network 101. The data bus 103 is, in this embodiment, also connected via gateway 115 to a wide area network 117. The purpose and function of each of the elements described above is well known to those skilled in the art and will not be described further.

As shown in FIG. 7, two local data input/output nodes 119 and 121 are also connected to the data bus 103. In this embodiment, these local data input/output nodes are located in different rooms 120 and 222 respectively, and have the same function as the local distribution nodes 3 shown in FIG. 1. In particular, local data input/output node 119 is arranged to receive laser beams 123 transmitted from the personal computers 125 and 127, work station 129 and printer 131, to modulate the respective laser beams 123 with appropriate data and to reflect the modulated beams back to the respective source. Accordingly, each of the PCs 125 and 127, the work station 129 and the printer 131 will comprise the circuitry of the user terminal 7 shown in FIG. 2, except the user unit 39 will correspond to either the PC 125 or 127, the work station 129 or the printer 131. Similarly, local data input/output node 121 is arranged to receive laser beams 135 transmitted from printer 137, laptops 139 and 141 and a personal computer 143, to modulate the respective laser beams 135 with appropriate data and to reflect the modulated beams back to the appropriate source. In this way, each of the printers 131 and 137, personal computers 125, 127 and 143, laptops 139 and 141 and the work station 129 can transmit data to and receive data from the local area network 101.

The particular way in which the data is transmitted to and from the local data input/output node 119 is similar to that used in the video data distribution system described with reference to FIGS. 1 to 6 and will therefore not be described again. However, since the laptops 139 and 141 are designed to be carried about by the user, the positional relationship between the laptops 139 and 141 and the local data input/output node 121 is not spatially fixed. Consequently, the point at which the laser beams from the laptops 139 and 141 hits the modulator (not shown) will change as the user moves the laptop. One way to overcome this problem is to employ a separate transceiver circuit (ie the circuitry shown in the user terminal 7 of FIG. 2) which has a fixed positional relationship relative to the local data input/output node 121 and which can be connected to the appropriate laptop 139 or 141 by cable. Alternatively, the array of modulators and demodulators located within the local data input/output node 121 could be operated in unison, wherein each modulator would receive the same modulation data and the signals from the demodulators would be connected together, and wherein each of the devices which are connected to the local data input/output node 121 would share the usage of the modulators in a time multiplexed manner. In this way, it does not matter if the laptops 139 and 141 move with respect to the local data input/output node 121, since their laser beams will always strike one modulator/demodulator cell. However, operating the modulators in unison, has the disadvantage of reducing the amount of data which can be transmitted per second through the local data input/output node 121. Alternatively still, if the spot size of the laser beams 135 were arranged to cover more than one cell $c_{ij}$, then the position of the laptops can be tracked and therefore, the assignment of the cells to the laptops can be dynamically changed as they move relative to the local data input/output node 121.

Figure 8:
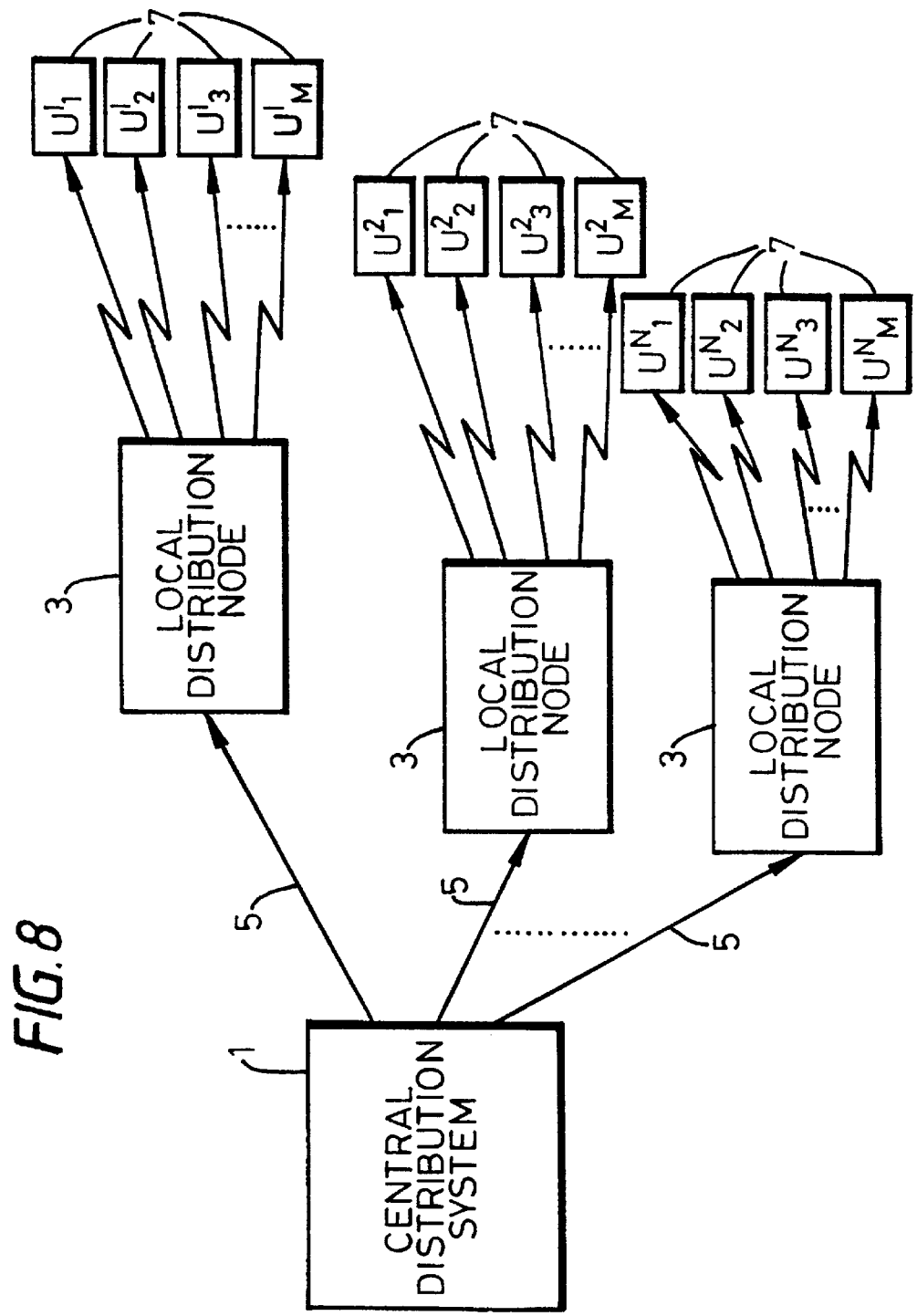
FIG. 8 is a schematic diagram of a data distribution system.

FIG. 8 schematically shows a data distribution system which employs a point to multipoint signalling system. The data distribution system is similar to the video data distribution system shown in FIG. 1, except that data is passed in only one direction, from the central distribution system 1 to the user terminals 7. Such a data distribution system can be employed to distribute information relating to, for example, the prices of shares which are bought and sold on a stock market. In such an application, the individual user terminals 7 would comprise a display unit for displaying the new prices of the stocks to the traders so that they can be kept up-to-date with changes in the share prices. Alternatively, such a one-way data distribution system could be used in railway stations, airports and the like for informing passengers of arrivals and departures etc.

Figure 9:
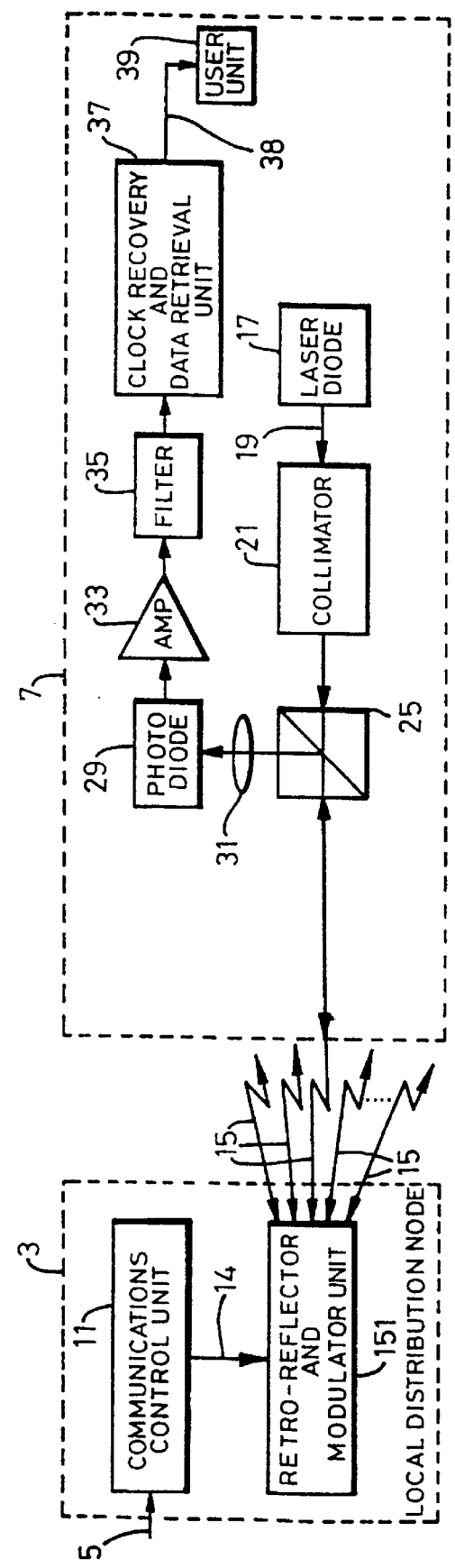
FIG. 9 is a schematic diagram of a local distribution node and a user terminal forming part of the data distribution system shown in FIG. 8.

FIG. 9 is a schematic block diagram of one of the local distribution nodes 3 and one of the user terminals 7 used in the data distribution system shown in FIG. 8. As shown, the local distribution node 3 comprises a communications control unit 11 which is operable to receive the optical data transmitted by the central distribution system 1 via the optical fibre bundle 5, to regenerate the transmitted data and to send appropriate modulation data 14 to the retro-reflector and modulator unit 151. The retro-reflector and modulator unit 151 operates in a similar manner to the retro-reflector and modem unit 13 shown in FIG. 3, except that it does not have any demodulators $d_{ij}$ for receiving communications transmitted from the user terminals 7.

As shown in FIG. 9, the user terminal 7 has a similar structure to the user terminal shown in FIG. 2, except that there is no optical beam expander 27 in front of the beam splitter 25 and there is no laser control circuit 41 for modulating the laser diode 17 for transmitting messages from the user terminal 7 back to the local distribution node 3. Additionally, in this embodiment, the user unit 39 comprises a display (not shown) which is operable to receive the data 38 output from the clock recovery and data retrieval unit 37 and to display it to the user. The remaining components of the user terminal 7 operate in a similar manner to the corresponding components shown in FIG. 2, and will not be described again.

Figure 10:
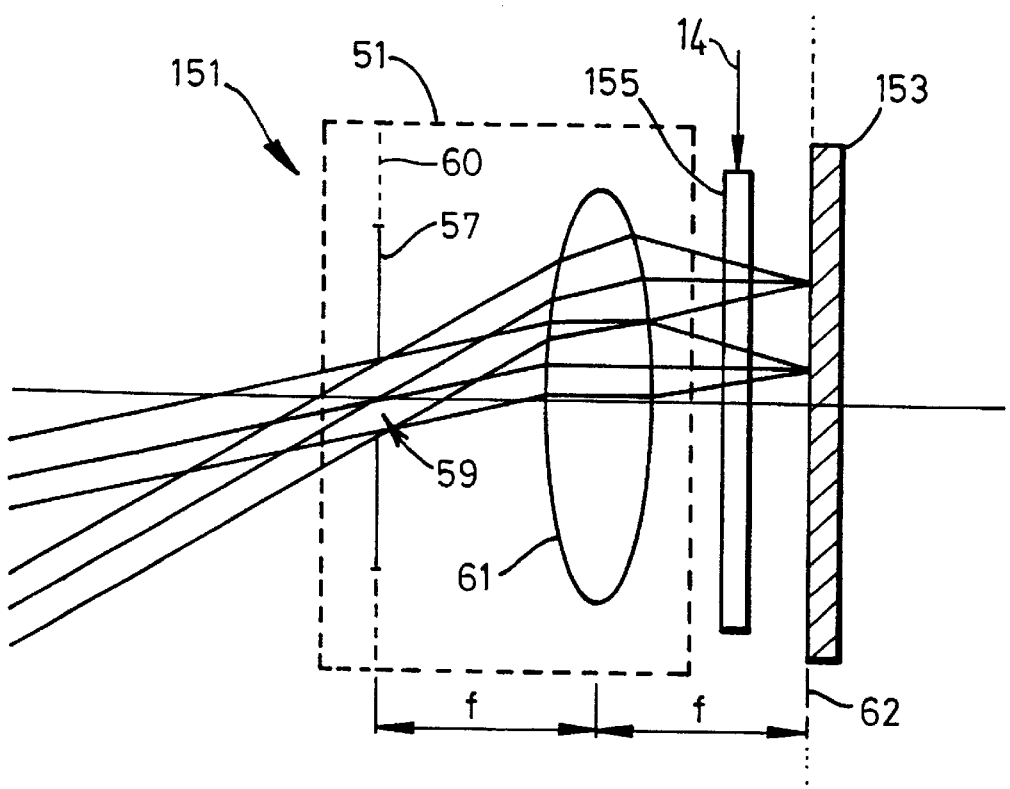
FIG. 10 is a schematic illustration of a retro-reflecting modulator employed in the local distribution node shown in FIG. 9.

FIG. 10, schematically shows the retro-reflector and modulator unit 151 employed in this embodiment. As in the first embodiment, the retro-reflector and modulator unit 151 employs a telecentric lens 51 which comprises a lens system 61 and a stop member 57, having a central aperture 59, which is located at the front focal plane 60 of the lens system 61. In this embodiment, a plane mirror 153 is located at the back focal plane 62 of the lens system 61 and a transmissive modulator 155 is located between the plane mirror 153 and the lens system 61.

In operation, a laser beam 15 from a user terminal 7 passes through the stop member 57 and is focused by the lens system 61 through the transmissive modulator 155, where it is modulated with the appropriate modulation data 14 supplied from the communications control unit 11 shown in FIG. 9, onto the plane mirror 153 where the modulated beam is reflected back to the user terminal 7.

Figure 11:
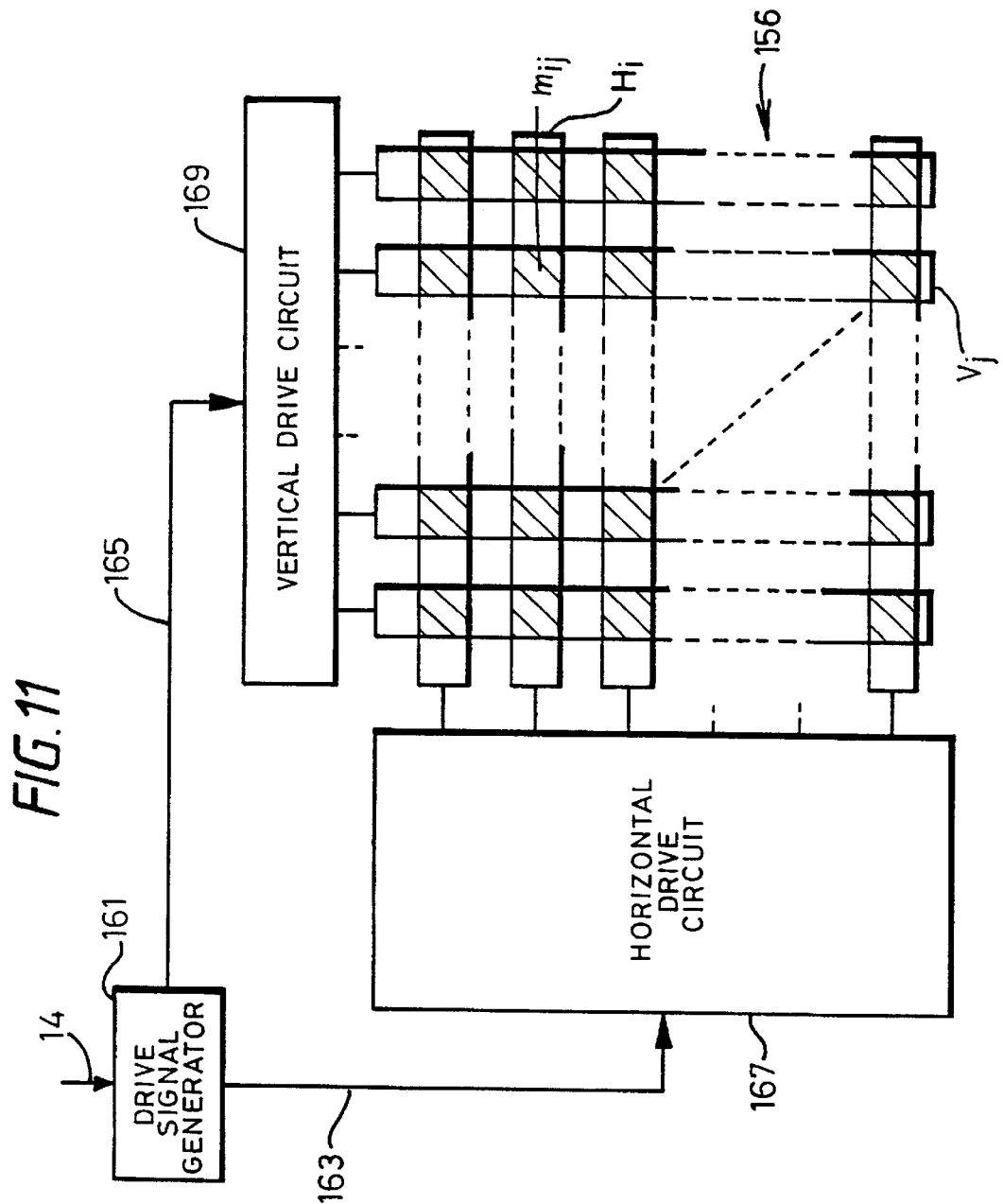
FIG. 11 schematically illustrates an array of liquid crystal modulators forming part of the retro-reflecting modulator shown in FIG. 10.

In this embodiment, an array of transmissive twisted nematic liquid crystal modulators are used in the modulator 155. FIG. 11 schematically illustrates such an array of liquid crystal modulators 156 and the associated drive circuitry employed to drive them. As shown, the array of liquid crystal modulators comprises a plurality of horizontal and vertical transparent electrodes which are disposed on either side of a layer of liquid crystal, with each modulator $m_{ij}$ being formed at the junction of a horizontal electrode $H_i$ and a vertical electrode $V_j$. The drive signals which are required to change the optical state of the liquid crystal modulator $m_{ij}$ are generated by the horizontal drive circuit 167 and the vertical drive circuit 169, under control of the drive signal generator 161. In particular, in response to the modulating data 14 supplied from the communications control unit 11 shown in FIG. 9, the drive signal generator 161 generates control signals 163 and 165 for controlling the horizontal drive circuit 167 and the vertical drive circuit 169 respectively, which in-turn apply appropriate driving signals to drive the appropriate modulator $m_{ij}$.

Figure 12:
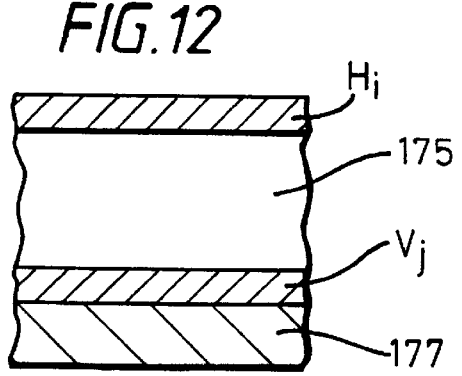
FIG. 12 shows a cross section of a portion of one of the liquid crystal modulators shown in FIG. 11.

FIG. 12 shows a cross-section of one of the modulators $m_{ij}$ in more detail. As shown the liquid crystal modulator $m_{ij}$ comprises a layer of twisted nematic liquid crystal 175 which is formed between a transparent horizontal electrode $H_i$ and a transparent vertical electrode $V_j$. In this embodiment, a polarised filter 177 is located behind the vertical electrode $V_j$ for transmitting light which is horizontally polarised and for blocking light which is vertically polarised.

The way in which the liquid crystal modulator operates will now be described with reference to FIGS. 13a and 13b. In particular, FIG. 13a schematically illustrates the operation of one of the liquid crystal modulators when no bias voltage is applied to the corresponding horizontal and vertical electrodes (not shown). In this embodiment the light emitted from the laser diode 17 is horizontally polarised. This is represented by the horizontal arrows 171 which approach the liquid crystal layer 175 from the left hand side. When no electric field is applied across the liquid crystal layer 175, because of the twisted nematic molecules, the polarisation of the incident light is rotated through 90°. Consequently, the laser beam which leaves the liquid crystal layer 175 will be vertically polarised, as represented by vertical arrows 172. In this embodiment, the polarised filter 177 is designed to block light which is vertically polarised. Therefore, when no electric field is applied across the liquid crystal layer 175 the light which passes therethrough is blocked by the polarised filter 177.

On the other hand, when an alternating electric field is applied across the liquid crystal layer 175, as shown in FIG. 13b, the twisted nematic molecules align with the electric field causing the light to pass through the liquid crystal layer 175 without a change in its polarisation state. Consequently, as illustrated by the arrows 174, the light which emerges from the liquid crystal layer 175 still has a horizontal component (although it may be slightly reduced) which will pass through the polarised filter 177 to the plane mirror 153. Since the reflected beam will also be horizontally polarised, it will also pass through the polarised filter 177 and through the liquid crystal layer 175 back towards the appropriate user terminal 7.

Therefore, by applying a suitable bias voltage to the appropriate horizontal and vertical electrodes, the liquid crystal modulators $m_{ij}$ can amplitude modulate the laser beam 15 received from the corresponding user terminal 7 in dependence upon the modulation data 14. In particular, to transmit a binary zero no bias voltage is applied to the electrodes, whereas to transmit a binary one an alternating bias voltage is applied to the electrodes.

One advantage of using liquid crystal modulators is that they can be made to operate over a wider range wavelengths of the incident light. Consequently, longer wavelength laser beams, such as 1500 nm wavelength lasers, can be used, which are less susceptible to absorption by rain. Use of longer wavelengths also allows higher transmitted power levels whilst still remaining within eye safety limits. However, use of liquid crystals has the disadvantage that their optical state can only be switched relatively slowly (a few hundred times per second) compared with the switching speed of the SEED modulators.

ALTERNATIVE EMBODIMENTS

Figure 14A:
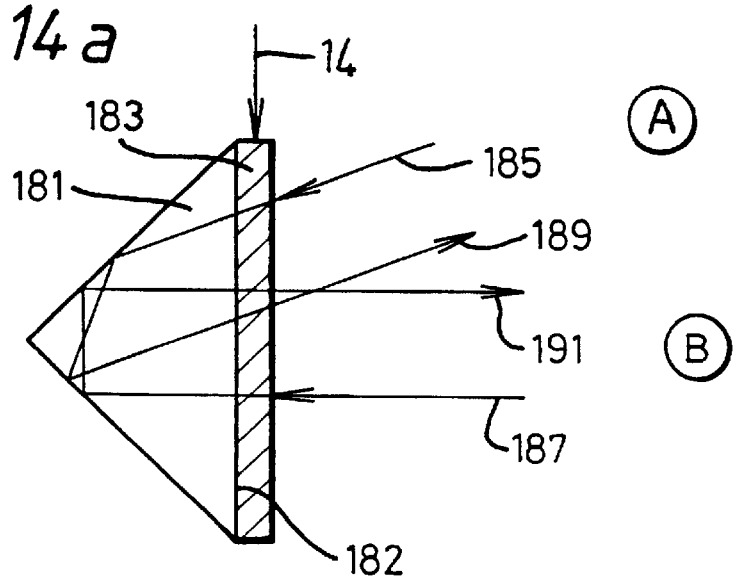
FIG. 14a is a schematic diagram of an alternative retro-reflecting modulator which may be employed a point to multipoint communication system.
Figure 14B:
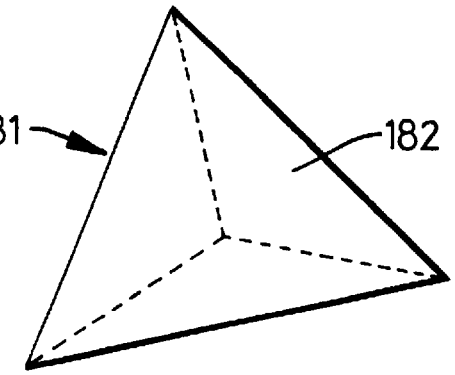

In the above embodiments, a telecentric lens was used in combination with a reactive modulator to form a retro-reflector. Other types of retro-reflectors could be used. For example, as shown in FIGS. 14a and 14b a corner cube type retro-reflector 181 made from a glass prism could be used with a layer of electro-optic modulating material 183 on the outer surface 182 of the corner cube 181. As shown, laser beams 185 and 187 from two different sources A and B respectively, pass through the modulating layer 183 and are modulated thereby in accordance with modulation data 14. The modulated laser beams 189 and 191 are then reflected off the walls of the corner cube 181 back to the respective sources A and B.

Figure 14C:
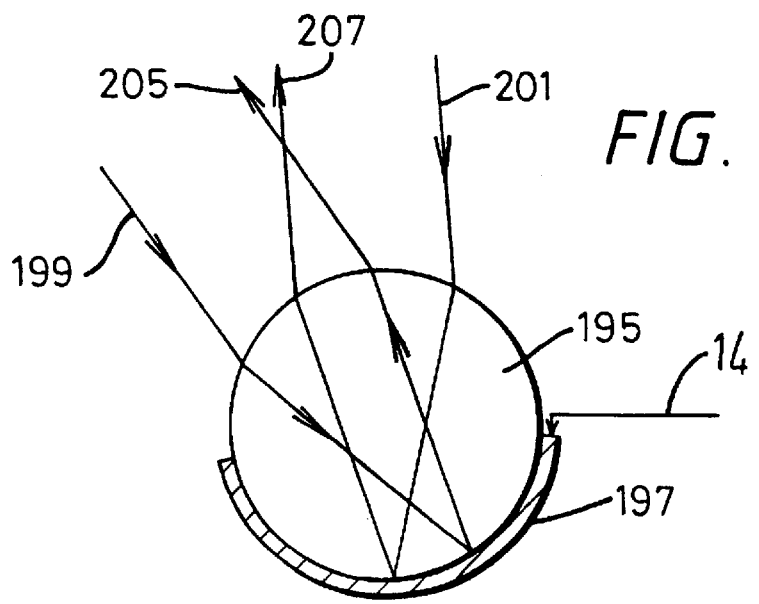
FIG. 14c is a cross sectional view of a further alternative retro-reflecting modulator which can be used in a point to multipoint signalling system.

Alternatively, as shown in FIG. 14c, a spherical retro-reflector 195 could be used with a layer of electro-optic modulating material 197 formed at the rear surface of the sphere 195. In operation, laser beams 199 and 201 from different sources (not shown) pass through the sphere 195 and are reflected and modulated with appropriate modulation data 14 by the modulating layer 197. The reflected beams 205, 207 then pass back through the sphere to the respective sources (not shown).

In the above embodiments, an array of SEED modulators or an array of liquid crystal modulators were used to modulate the laser beams from the different sources. Other types of modulators can be used, such as electro-optic modulators which can modulate the phase or the amplitude of the laser beams. For example, an electric field applied across Lithium Niobate (LiNbO3) produces a change in the refractive index of the crystal in the direction of the electric field. This in turn, imparts a corresponding phase change on the incident light. Commercially available phase modulators based on Lithium Niobate can operate with bandwidths up to several 100 MHz. However, a problem with providing an array of electro-optic modulators is that the current packaging used with these devices prevents them from being fused together to produce a single pixellated modulator which can be placed at the back focal plane of the telecentric lens system. However, this problem can be overcome by using optical fibres with one end of the fibres being located at the back focal plane of the telecentric lens and with the other end interfaced with the appropriate individual modulator.

Another type of modulating device which can be used are micro-mechanical devices, such as the Texas Instruments micro-mirror array which is currently used in their projection display systems. Such devices are ideal for integration with the telecentric retro-reflector. However, as with the liquid crystal type modulators, the switching speed of the individual mirrors is relatively slow compared with the SEED modulators. In particular, the individual mirrors in current micro-mirror arrays can be switched at most at 500 times per second.

Figure 15A:
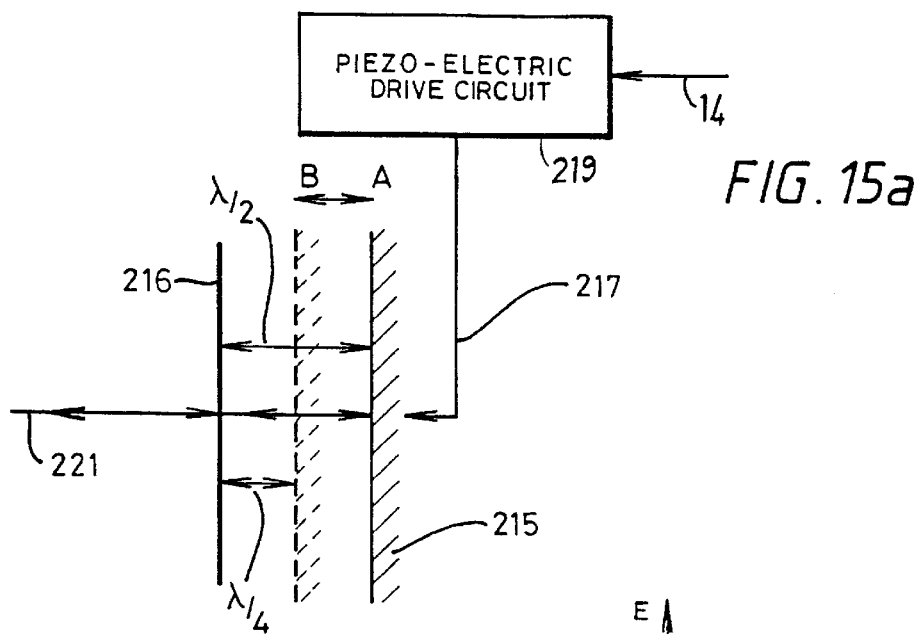
FIG. 15a illustrates an alternative type of modulator which can be used in a retro-reflector in a point to multipoint signalling system.

There are also a number of other micro-mechanical systems based on interferometry which offer high speed switching and the possibility of being built up into an integrated array to produce a pixellated modulator. For example, devices based on a Fabry-Perot cavity, fabricated by surface micro-machining, which use electrostatic actuation can achieve modulation rates of about 3 Mb/s. FIG. 15a schematically illustrates the principal of operation of such a Fabry-Perot cavity type modulator. As shown, the modulator comprises a half mirror 216 and a plane mirror 215. The plane mirror 215 can be moved relative to the half mirror 216 between position A and position B by applying a suitable drive signal 217 which is generated by the piezo-electric drive circuit 219.

In operation, the laser beam 221 strikes the half mirror 216 and is partially reflected thereby. However, half of the laser beam passes through and is reflected by the plane mirror 215. When the plane mirror 215 is in position A, the separation between the half mirror 216 and the plane mirror 215 is arranged to be half the wavelength ($\lambda$) of the laser beam 221 and when the mirror is in position B, the separation between the half mirror 216 and the plane mirror 216 is arranged to be a quarter of the wavelength ($\lambda$) of the laser beam 221. Therefore, when the plane mirror 215 is in position A, the portion of the laser beam which passes through the half mirror 216 travels one wavelength of the laser beam further than the portion of the laser beam which is reflected by the half mirror 216. Whereas, when the plane mirror 215 is in position B, the portion of the laser beam which passes through the half mirror 216 travels half the wavelength of the laser beam further than the portion of the laser beam which is reflected by the half mirror 216.

Figure 15B:
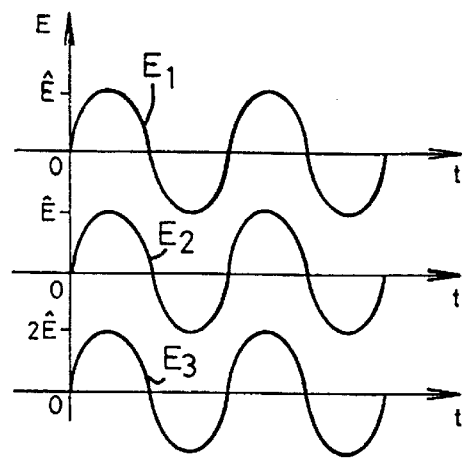
Figure 15C:
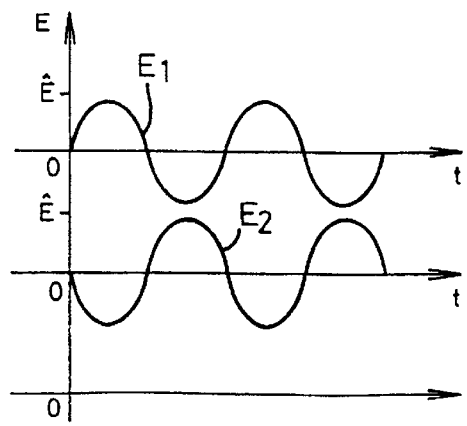

FIG. 15b is a signal diagram which shows the electric field $E_1$ of the laser beam reflected from the half mirror 216, the electric field $E_2$ of the laser beam which is reflected by the plane mirror 215 and the electric field $E_3$ of the resulting reflected laser beam obtained by adding the two reflected laser beams $E_1$ and $E_2$, when the plane mirror 215 is in position A. As shown in FIG. 15b, the two electric fields $E_1$ and $E_2$ are in-phase with each other and therefore, add together constructively to provide an electric field $E_3$ having a peak amplitude which is twice that of the electric fields $E_1$ and $E_2$. FIG. 15c is a signal, diagram which shows the electric fields $E_1$ and $E_2$ of the two reflected laser beams and of the resulting laser beam when the plane mirror 215 is in position B. As shown, the electric field $E_2$ of the laser beam reflected from the plane mirror 215 is 180° out of phase with the electric field $E_1$ of the laser beam reflected by the half mirror 216. Consequently, the two electric fields $E_1$ and $E_2$ add destructively, resulting in the two reflected laser beams cancelling each other out.

Consequently, by generating appropriate drive signals 217, the piezo-electric drive circuit 219 can amplitude modulate the laser beam 221 in dependence upon the modulation data 14 which is received from the communications control unit 11.

In the above embodiments, the modulators were used, in effect, to amplitude modulate the laser beam transmitted from the user terminals. Other types of modulation can be performed on the laser beams. For example, as mentioned above, electro-optic modulators such as Lithium Niobate can apply a phase or an amplitude modulation to the laser beam. Modulation of the phase has the advantage that the phase of the reflected light does not change during transmission back to the user terminals. Therefore, phase modulation could be used to facilitate the transmission of multi-valued data, which would significantly increase the data rate between the distribution nodes and the user terminals.

Figure 16A:
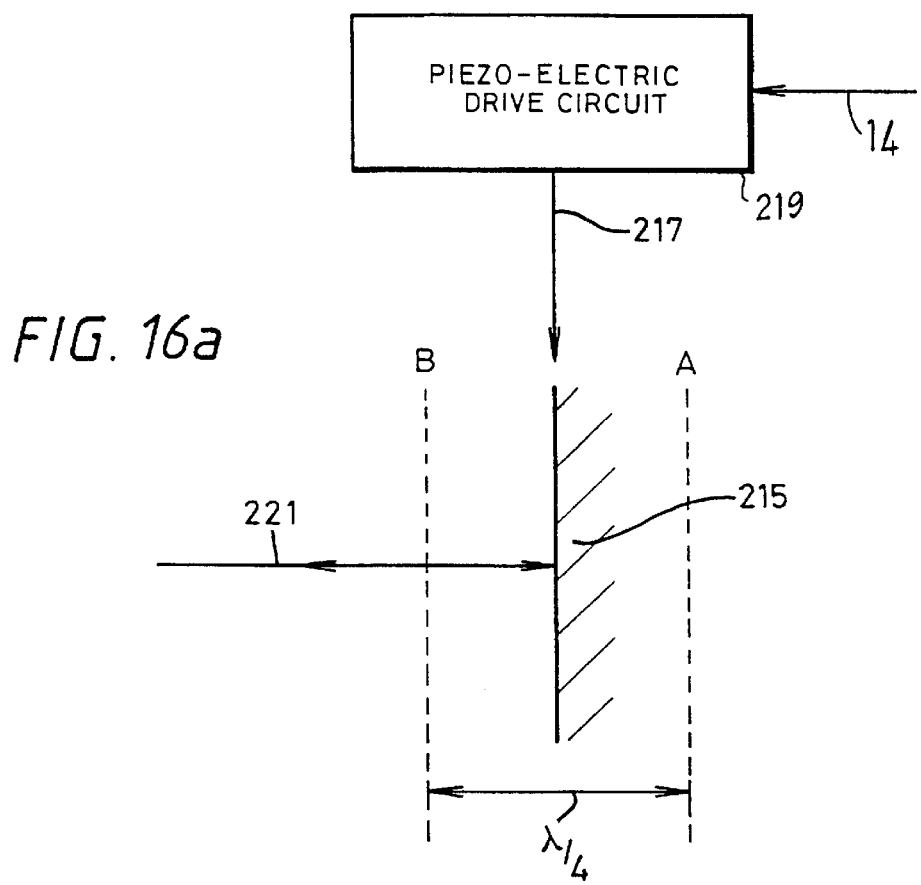
FIG. 16a is a schematic diagram of a piezoelectric modulator which can perform phase and frequency modulation to light incident thereon.

Alternatively, phase and frequency modulation can simply be achieved by moving a plane mirror 215 along the optical axis of the received laser beams. Such a modulator is illustrated in FIG. 16a. In operation, the plane mirror 215 is moved between position A and position B by an electrostatic drive signal 217 generated by a piezo-electric drive circuit 219 in response to the modulation data 14.

By making the distance between position A and position B equal to a quarter of the wavelength ($\lambda$) of the laser beam 221 and by stepping the position of the mirror 215 between position A and position B, a phase shift of 90° can be imparted on the reflected laser beam 221 because of the different path lengths over which the laser beam travels. Additionally, since frequency modulation is simply the time derivative of phase modulation, frequency modulation can be achieved by continuously ramping the phase, ie by continuously moving the mirror 215 between position A and position B, with the speed at which the mirror is moved between the two positions being determined by the number of consecutive like bits in the modulation data 14.

Figure 16B:
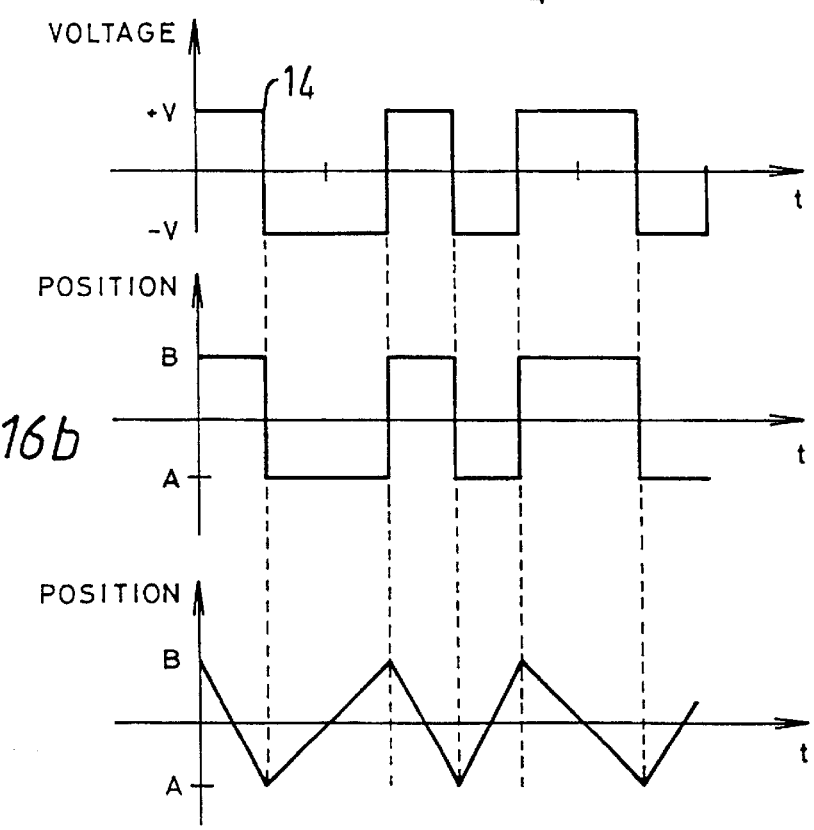

FIG. 16b, illustrates the way in which the mirror 215 should be moved to achieve phase and frequency modulation for the modulation data 14 shown in the top diagram of FIG. 16b. In particular, the middle diagram of FIG. 16b, shows phase modulation, wherein the position of the mirror 215 is stepped between position B and position A in dependence upon the modulation data 14. As shown in the bottom signal diagram of FIG. 16b, frequency modulation can be achieved by continuously ramping the position of the mirror between position A and position B in dependence upon the modulation data 14.

Another type of light modulator which can be used is being developed by Silicon Light Machines in California and is an interferometry micro-machined technology which is based on an electrostatically actuated diffraction grating. With this technology, single pixel switching speeds of the order of 20 ns can be achieved. Silicon Light Machines are currently producing a linear array of devices for display applications, and they are developing a two-dimensional array. Such modulators would be highly suited for some applications since these devices can be fabricated using standard lithographic techniques at relatively low cost in volume.

In the above embodiments, a 50 mW laser diode was provided in each of the user terminals, so that the user terminals can communicate with the corresponding local distribution node within a range of about 150 metres. In applications where the distance between the user terminals and the local distribution nodes is relatively small, such as a few metres, lower powered laser diodes such as those which are commonly used in CD players or light emitting diodes could be used. Alternatively, in other applications, such as satellite to satellite communications, high powered lasers could be used where the distance between the signalling devices is relatively large.

In the above described embodiments, a pixellated modulator, ie an array of modulators, was employed to modulate the light from the different sources. In an alternative embodiment, a single modulator which covers the entire back focal plane of the telecentric lens could be used. In such an embodiment, each of the users would receive either the same information or different channels could be provided for the respective users by time division multiplexing the modulation which is applied to the single modulator. In such an embodiment, each of the sources would receive all the modulated data but each source would only demodulate the data which is directed to it. However, this type of single modulator is not preferred because the modulator must be relatively large and large modulators are difficult to produce and, for some applications, cannot be modulated quickly enough to provide the desired data rate. In the above embodiments, when the reflected light hits the beam splitter, some of the reflected light will propagate through towards the laser diode. In order to increase the amount of light which is reflected towards the photo-diode, a polarised beam splitter and a quarter wave plate could be used in the user terminal. In operation, the polarisation of the laser beam output from the laser diode would have to be aligned with the polarisation of the polarised beam splitter so that the output laser beam passes through the beam splitter, the quarter wave plate and the optical beam expander to the retro-reflector and modem unit. The quarter wave plate converts the linearly polarised light beam into, for example, right hand circular polarised light. The mirror/modulator in the retro-reflector then changes the polarised light of the reflected beam into left hand circular polarisation which is then converted back into linearly polarised light by the quarter wave plate. However, due to the change from right hand circular to left hand circular, the linear polarisation of the reflected beam after the quarter wave plate is orthogonal to the original polarisation of the laser beam. Therefore, when the reflected beam reaches the polarised beam splitter, all of it is deflected towards the photo-diode.

In the above embodiments, the receiver circuitry of the user terminals was arranged to directly detect the modulation data applied to the reflected beam. However, since the receiver circuit and the optical source are located at the same point in the communication system, coherent homodyne optical detection can be used which improves the receiver sensitivity over conventional direct detection techniques at little additional complexity and cost. In particular, by arranging for some of the laser beam from the laser diode to be split from the main path onto the photo diode together with the reflected beam, the modulation data is retrieved by coherent homodyne detection with a sensitivity gain of the order of 10 dB over the direct detection technique.

Figure 17:
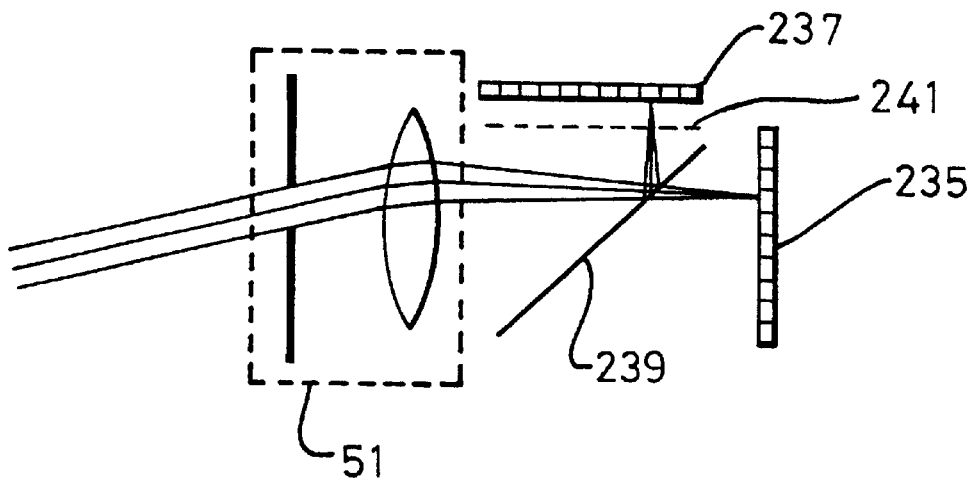
FIG. 17 is a schematic diagram of a retro-reflector and modem unit which uses a beam splitter to split incident laser beams onto a separate modulator array and demodulator array.

In the above embodiments where a two-way signalling system was provided between the local distribution node and the user terminals, a combined array of modulators and demodulators was provided in the retro-reflector and modem unit. Alternatively, as shown in FIG. 17, the array of modulators 235 can be provided separately from the array of demodulators 237, by placing a beam splitter 239 between the telecentric lens 51 and the array of modulators 235. Additionally, as represented by the dashed line 24, a lens may also be provided between the beam splitter 239 and the array of demodulators 235. Additionally, as represented by the dashed line 241, a lens may also be provided between the beam splitter 239 and the array of demodulators 237 if the two arrays have a different size.

Figure 18:
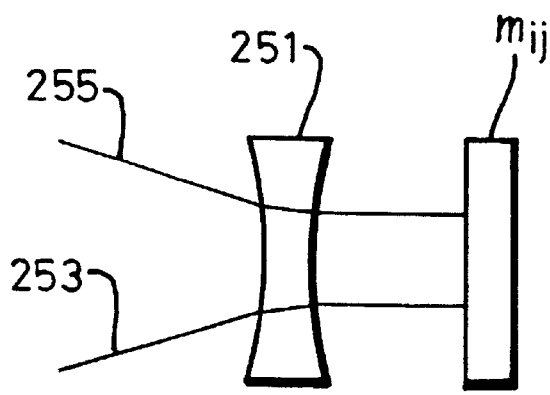
FIG. 18 is a schematic diagram which illustrates the way in which a micro-lens can be placed in front of a modulator cell so as to increase the collimation of light into the modulator cell.

In the above embodiments which use a telecentric lens, the laser beams from the different sources are focused onto the array of modulators which are placed at or near the focal plane of the telecentric lens. However, the convergence angle of the laser beam onto the respective modulator depends upon the particular optics used in the telecentric lens. Where this angle of convergence is relatively large, the collimation of the rays entering the modulator can be improved by placing a micro lens in front of each of the modulators which introduces negative optical power. FIG. 18, schematically shows the way in which a micro lens 251 can be placed in front of a modulator element $m_{ij}$ which has the effect of collimating the rays 253 and 255 into the modulator $m_{ij}$.

In the above embodiments, a planar array of modulators was used within the local distribution nodes. However, by choosing appropriate focusing elements in the telecentric lens, a curved or plane and partially curved array of modulators could be used with the curvature of the modulator array being designed so that the principal rays through the telecentric lens are normal to the surface of the respective modulators. Similarly, where a transmissive type modulator is used, the plane mirror located at the focal plane of the telecentric lens could also be curved depending on the optics which are used.

In the above embodiments, a reflective surface was used either in the modulator or after the modulator for reflecting the laser beams back to the respective sources. Ideally, a phase conjugate mirror would be used since this allow distortions in the laser beam transmission to be compensated which further reduces the transmission loss.

In the above embodiments, the signals used to communicate information were optical signals. However, other frequencies could be used. For example, if microwave frequencies are used, an array of microwave waveguides could be placed at the focal plane of a telecentric microwave lens, with the modulation being achieved by varying the impedance matching of the waveguide.

In the above embodiments, the point to multipoint signalling system comprised a three-layer hierarchy. The present invention is not intended to be so limited. The signalling system used could be between a single data distribution system and a plurality of separate destination terminals. Alternatively still, the central distribution system could form part of a larger communication system with higher levels of hierarchy.

Figure 19:
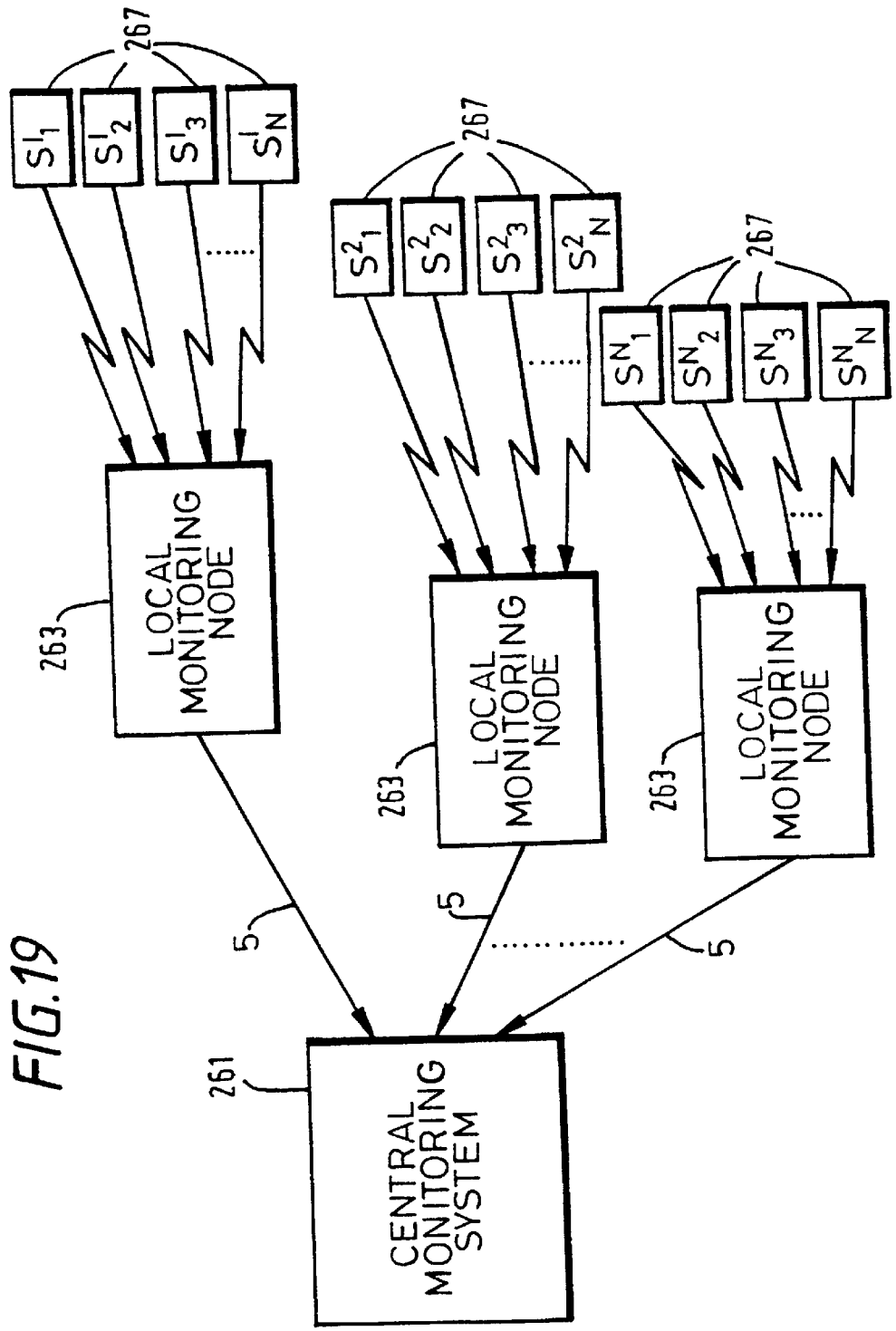
FIG. 19 is a block diagram of a multipoint to point monitoring system.

In the above embodiments, a point to multipoint signalling system has been described. FIG. 19 shows a multipoint to point signalling system for communicating data from different sources to a central monitoring system 261. As shown, the central monitoring system 261 is connected to a plurality of local monitoring nodes 263 via optical fibre bundles 5. In turn, the local monitoring nodes 263 receive communications through free space which are transmitted by sensor terminals 267 which are fixed relative to the monitoring nodes 263.

In operation, the sensor terminals 267 monitor some physical event, and transmit optical status data to the local monitoring node 263 in response. The local monitoring nodes 263 then collate the data and transmit appropriate data back to the central monitoring system 261 via the optical fibre bundles 5. In the embodiment, the sensor terminals 267 sense motion, temperature, humidity, sound etc. and form part of a security system.

Figure 20:
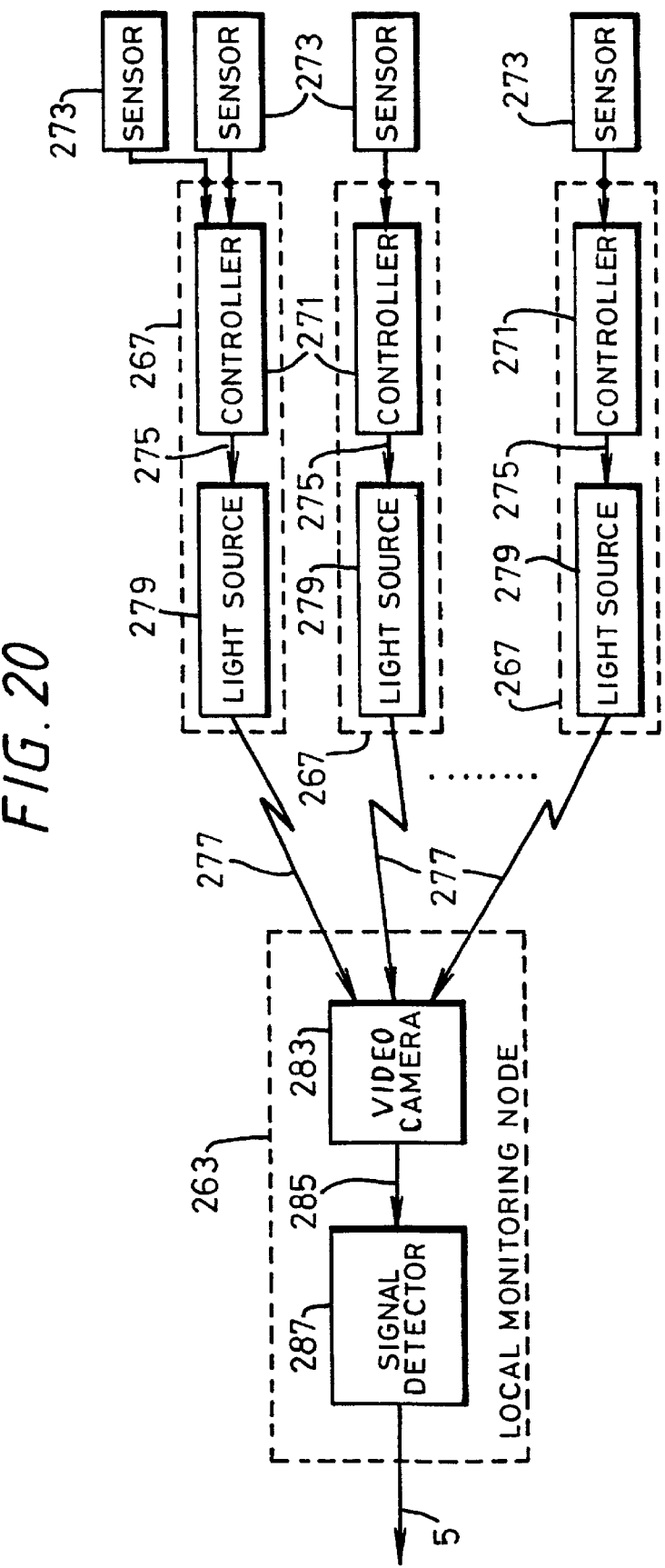
FIG. 20 is a block diagram which illustrates a local monitoring node and a number of sensor terminals forming part of the monitoring system shown in FIG. 19.

FIG. 20, schematically illustrates in more detail, the main components of the local monitoring node 263 and some of the sensor terminals 267. As shown, each sensor terminal 267 comprises a controller 271 which is operable to receive signals from one or more sensors 273 and to output modulation data in dependence thereon for modulating the light output by a light source 279.

As shown, the local monitoring node 263 comprises a video camera 283 for monitoring the light output from the respective sensor terminals 267, and to output appropriate video signals 285 to a signal detector 287. In operation, the sensors 273 sense the local temperature/movement etc and supply corresponding sensor signals to the controller unit 271 of the respective sensor terminal 267. The controller unit 271 analyses the sensor data and, if appropriate, generates modulation data 275 for modulating the light 277 produced by the corresponding light source 279. In response, the output video signal 285 from the video camera 283 changes, due to the modulation of the light source 279 and this change is detected by the signal detector 287. The signal detector 287 can identify from which sensor terminal 267 the modulated light came from simply by determining the location of the modulated light within one frame of the video signal 285, because the sensor terminals 267 are fixed relative to the local monitoring node 263.

In its simplest form, the modulation performed to the light 277 will simply be to switch on the light source 279 in response to a particular event sensed by the corresponding sensor or sensors 273. Alternatively, the light 277 might be modulated to include data describing the event which has been sensed by the sensor 273.

Instead of using a video camera 283, a telecentric lens could be used with an array of photo detectors placed at the focal plane of the telecentric lens, with each detector element of the array being associated with a predetermined sensor terminal 267. However, such a system is equivalent to the video camera, where the array of detectors comprises an array of charged coupled devices, with a respective charge coupled device being assigned to a corresponding sensor terminal 267.

The monitoring system described above has many applications. For example, it can be used in security applications for monitoring a number of different warehouses and for relaying the sensed data back to a central security station. Alternatively, the system could be employed in industrial applications where the sensed conditions are used to control the industrial plant. In particular, in such a system, each of the sensor terminals 267 might have a corresponding actuation terminal which is controlled by sending appropriate control data from the central monitoring system back through the optical fibre bundles 5 to the local monitoring nodes 263 and back to the corresponding actuation terminals associated with the sensor terminal.

The present invention is not limited by the exemplary embodiments described above, and various other modifications and embodiments will be apparent to those skilled in the art.

What is claimed is:

1. A signalling system comprising first and second signalling devices, wherein:

the first signalling device comprises a retro-reflecting modulator having a telecentric lens, a modulator and a reflector, and the retro-reflecting modulator being operable to receive a signal transmitted from said second signalling device and to modulate and reflect the received signal back to the second signalling device, to transmit a modulated signal to the second signalling device; and wherein the second signalling device comprises: a signal generator operable to generate a signal; a transmitter operable to transmit the generated signal to said first signalling device; a receiver operable to receive the modulated signal from said first signalling device; and a processor operable to retrieve modulation data from the modulated signal.

2. A system according to claim 1, wherein the telecentric lens has a front focal plane and comprises a stop member located substantially at said front focal plane for blocking part of the received signal from reaching said reflector.

3. A system according to claim 2, wherein said telecentric lens comprises a wide angled lens.

4. A system according to claim 1, wherein said modulator is transmissive and is located between said telecentric lens and said reflector.

5. A system according to claim 1, wherein said reflector comprises a mirror.

6. A system according to claim 1, wherein said telecentric lens has a curved or partially curved back focal plane and wherein said reflector is curved or partially curved to match the focal plane of said telecentric lens.

7. A system according to claim 1, wherein said modulator is operable to modulate at least one of the amplitude, phase, frequency or polarisation of the received signal.

8. A system according to claim 1, wherein said modulator comprises said reflector.

9. A system according to claim 1, wherein said received signal comprises light.

10. A system according to claim 9, wherein said modulator comprises a self electro-optic effect device.

11. A system according to claim 9, wherein said modulator comprises an electro-optic modulator.

12. A system according to claim 9, wherein said modulator comprises a liquid crystal modulator.

13. A system according to claim 9, wherein said modulator comprises a micro-mechanical modulator.

14. A system according to claim 9, wherein said signal generator of said second signalling device comprises a laser, a laser diode or a light emitting diode.

15. A system according to claim 9, wherein said signal generator of said second signalling device comprises a laser diode which is operable to output laser light of a predetermined wavelength, and wherein each of said second signalling devices further comprises means for collimating the laser beam output by said laser diode.

16. A system according to claim 9, wherein said modulator comprises a semiconductor electro-optic device.

17. A system according to claim 16, comprising a drive circuit for applying an electric drive signal to said semiconductor electro-optic device, the drive signal varying in dependence upon data to be transmitted from said first signalling device to said second signalling device.

18. A system according to claim 17, wherein said drive circuit is operable to vary a bias voltage applied to said semiconductor electro-optic device in dependence upon the data to be transmitted from said first signalling device to said second signalling device.

19. A system according to claim 18, wherein said drive circuit is operable to vary a light absorption characteristic of the semiconductor electro-optic device.

20. A system according to claim 9, wherein said telecentric lens is operable to focus light transmitted by said second signalling device to a spot on said reflector, and wherein the position of the spot on said reflector depends upon the position of the second signalling device within the field of view of the retro-reflecting modulator.

21. A system according to claim 20, comprising a plurality of second signalling devices each operable to generate a light signal and to transmit the generated light signal to said first signalling device, wherein said modulator of said first signalling device is operable to modulate the received light signals with respective modulation data for the second signalling devices, wherein said reflector of the first signalling device is operable to reflect the modulated signals back to the respective second signalling devices and wherein the respective second signalling devices are operable to receive the light signal which is reflected back from said first signalling device and are operable to retrieve the modulation data from the reflected light signal.

22. A system according to claim 21, wherein said second signalling devices are provided in different positions within the field of view of said retro-reflecting modulator and wherein the retro-reflecting modulator of said first signalling device comprises a plurality of modulators which are arranged so that the light signal from each of said second signalling devices is modulated by a respective different modulator of said plurality.

23. A system according to claim 22, wherein said plurality of modulators are located substantially at a the back focal plane of said telecentric lens.

24. A system according to claim 23, wherein said telecentric lens is arranged so that the spot of the focused light signals substantially corresponds to the size of the corresponding modulator.

25. A system according to claim 1, wherein said second signalling device is operable to transmit a message to said first signalling device by modulating the transmitted signal, and wherein said first signalling device comprises means for retrieving the message from the received signal.

26. A system according to claim 25, wherein said second signalling device is operable to apply a different modulation to said signal from the modulation applied by said modulator of said first signalling device.

27. A system according to claim 25, wherein said first signalling device comprises a detector for detecting the signal transmitted from said second signalling device, and a processor operable to retrieve any messages modulated onto the received signals by the second signalling device.

28. A system according to claim 1, wherein said telecentric lens is operable to receive the signal transmitted from the second signalling device; wherein said modulator is operable to modulate the received signal with modulation data for the second signalling device, and wherein said reflector is operable to reflect the modulated signal back to the second signalling device.

29. A system according to claim 1, comprising a plurality of second signalling devices each operable to generate a signal and to transmit the generated signal to said first signalling device, wherein said modulator of said first signalling device is operable to modulate the received signals with respective modulation data for the second signalling devices, wherein said reflector of the first signalling device is operable to reflect the modulated signals back to the respective second signalling devices and wherein the respective second signalling devices are operable to receive the modulated signal which is reflected back from said first signalling device and are operable to retrieve the modulation data from the reflected signal.

30. A system according to claim 29, wherein said modulator is operable to apply the same modulation data to the signal received from each second signalling device.

31. A system according to claim 29, wherein the same modulator is used to modulate each of the received signals in a time multiplexed manner.

32. A system according to claim 29, wherein said retro-reflecting modulator comprises a plurality of modulators, at least one for each of said second signalling devices.

33. A system according to claim 32, wherein said plurality of modulators are arranged in an ordered array.

34. A system according to claim 33, wherein said plurality of modulators are arranged in a two-dimensional array.

35. A system according to claim 33, wherein said first signalling device further comprises an array of micro-lenses corresponding to said array of modulators and located adjacent said array of modulators, for increasing the collimation of the signals input to the respective modulators.

36. A system according to claim 33, wherein at least one of said second signalling devices is operable to transmit a message to the first signalling device by modulating the transmitted signal, wherein said first signalling device comprises a plurality of detectors for detecting the signal transmitted from said second signalling devices and means for retrieving the message modulated onto the received signal by the second signalling device, and wherein said plurality of detectors are arranged in an array corresponding to the array of modulators.

37. A system according to claim 36, wherein the corresponding detector and modulator are located adjacent to each other.

38. A system according to claim 36, wherein the array of detectors and the array of modulators are located separately from each other, and wherein the first signalling device further comprises a splitter operable to split the received signals onto the respective modulator/detector arrays.

39. A system according to claim 32, wherein said retro-reflecting modulator comprises more modulators than there are second signalling devices.

40. A system according to claim 39, wherein one or more of said second signalling devices is movable relative to said first signalling device and wherein said retro-reflecting modulator of said first signalling device is operable to re-assign a modulator to said second signalling device in dependence upon the movement of the second signalling device within the field of view of the telecentric lens of the retro-reflecting modulator.

41. A system according to claim 1, wherein said retro-reflecting modulator is operable to reflect the received signal back along a principal axis of the received signal.

42. A signalling system according to claim 1, further comprising a third signalling device for transmitting modulation data to said first signalling device for modulating the signal transmitted from said second signalling device and wherein said first signalling device further comprises means for receiving said modulation data from said third signalling device.

43. A signalling system according to claim 1, wherein said second signalling device is operable to transmit a light beam having a wide beamwidth towards said first signalling device and wherein part of said wide beamwidth light beam is received and reflected back to said second signalling device by said retro-reflecting modulator.

44. A system according to claim 1, wherein said reflector is optically located substantially at a back focal plane of said telecentric lens.

45. A system according to claim 44, wherein said reflector is physically located away from said back focal plane and further comprising an optical guide extending between said back focal plane and said reflector for optically locating said reflector substantially at said back focal plane.

46. A retro-reflector comprising:
    a telecentric lens for focusing signals received from a source; and
    a reflector, located substantially at a back focal plane of said telecentric lens, operable to reflect said received signals back to said source.

47. A retro-reflector according to claim 46, wherein said telecentric lens comprises a wide angled lens.

48. A retro-reflector according to claim 46, wherein said reflector has a curved or partially curved surface to match the back focal plane of said telecentric lens.

49. A retro-reflector according to claim 46, wherein said reflector comprises a mirror.

50. A retro-reflector according to claim 46, further comprising a modulator for modulating the received signals with modulation data.

51. A retro-reflector according to claim 50, wherein said modulator is transmissive and is located between said telecentric lens and said reflector.

52. A retro-reflector according to claim 50, wherein said modulator is operable to modulate at least one of the amplitude, phase, frequency or polarisation of the received signals.

53. A retro-reflector according to claim 50, wherein said modulator comprises said reflector.

54. A retro-reflector according to claim 50, wherein said modulator comprises a self electro-optic effect device.

55. A retro-reflector according to claim 50, wherein said modulator comprises an electro-optic modulator.

56. A retro-modulator according to claim 50, wherein said modulator comprises a liquid crystal modulator.

57. A retro-reflector according to claim 50, wherein said modulator comprises a micro-mechanical modulator.

58. A retro-reflector according to claim 50, operable to receive signals from a plurality of sources, and wherein said modulator is operable to apply the same modulation data to the signals received from each of said sources.

59. A retro-reflector according to claim 58, wherein the same modulator is used to modulate each of the received signals in a time multiplexed manner.

60. A retro-reflector according to claim 50, wherein said modulator comprises a semiconductor electro-optic device.

61. A retro-reflector according to claim 60, comprising a drive circuit for applying an electric drive signal to said semiconductor electro-optic device, the drive signal varying in dependence upon data to be transmitted to a remote signalling device.

62. A retro-reflector according to claim 61, wherein said drive circuit is operable to vary a bias voltage applied to said semiconductor electro-optic device in dependence upon the data to be transmitted to said remote signalling device.

63. A retro-reflector according to claim 62, wherein said drive circuit is operable to vary a light absorption characteristic of the semiconductor electro-optic device.

64. A retro-reflector according to claim 50, wherein said modulator is located substantially at the back focal plane of said telecentric lens.

65. A retro-reflector according to claim 46, wherein said received signals comprise light.

66. A retro-reflector according to claim 46, operable to receive signals from a plurality of sources and comprising a plurality of modulators each arranged to modulate the signal received from a respective one of said sources.

67. A retro-reflector according to claim 66, wherein said plurality of modulators are arranged in an ordered array.

68. A retro-reflector according to claim 67, wherein said plurality of modulators are arranged in a two-dimensional array.

69. A retro-reflector according to claim 67, further comprising an array of micro-lenses corresponding to said array of modulators and located adjacent said array of modulators, for increasing the collimation of the signals input to the respective modulators.

70. A retro-reflector according to claim 46, further comprising a detector for detecting the received signal and a processor operable to retrieve any message carried by the received signal.

71. A retro-reflector according to claim 46, further comprising a plurality of detectors for detecting the signal received from a plurality of different sources and a processor operable to retrieve any messages modulated onto the received signals by the respective sources.

72. A retro-reflector according to claim 71, operable to receive signals from a plurality of sources and comprising a plurality of modulators arranged in an ordered array and each modulator being arranged to modulate the signal received from a respective one of said sources and wherein said plurality of detectors are arranged in an array corresponding to the array of modulators.

73. A retro-reflector according to claim 72, wherein the corresponding detector and modulator are located adjacent to each other.

74. A retro-reflector according to claim 72, wherein the array of detectors and the array of modulators are located separately from each other, and further comprising a signal splitter operable to split the received signals onto the respective modulator/detector arrays.

75. A retro-reflector comprising a telecentric lens for receiving and focusing light from a light source and a reflecting means located substantially at the focal plane of said telecentric lens for reflecting said light back to said light source.

76. An optical point to multipoint signalling system comprising a first signalling device and a plurality of second signalling devices, wherein:
    the first signalling device comprises a retro-reflector operable to receive light beams from the plurality of second signalling devices and to reflect the received light beams back to the respective second signalling devices; and means for modulating the received light beams with respective modulation data for the second signalling devices; and
    wherein each second signalling device comprises a light source for outputting a light beam towards said first signalling device; and means for receiving the modulated light beam which is reflected back from said first signalling device; and
    wherein said retro-reflector comprises a telecentric lens and a reflector.

77. A system according to claim 76, wherein said reflector is optically located substantially at a back focal plane of said telecentric lens.

78. A system according to claim 77, wherein said reflector is physically located away from said back focal plane and further comprising an optical guide extending between said back focal plane and said reflector for optically locating said reflector substantially at said back focal plane.

79. A signalling device for use in a signalling system comprising:
- a telecentric lens for focusing signals received from a source;
- a reflector operable to reflect said received signals back to said source; and
- a modulator for modulating the received signals with modulation data.

80. A signalling kit comprising one or more first signalling devices according to claim 79 and a plurality of second signalling devices, each comprising:
- a signal generator operable to generate a signal; a transmitter operable to transmit the generated signal to said first signalling device;
- a receiver for receiving the signal which is reflected back from the first signalling device; and
- means for retrieving modulation data from the reflected signal.

81. A data distribution system comprising a retro-reflector having a telecentric lens for focusing signals received from a source; and a reflector operable to reflect said received signals back to said source.

82. An office communications network comprising a retro-reflector having a telecentric lens for focusing signals received from a source; and a reflector operable to reflect said received signals back to said source.

83. A signalling method using first and second signalling devices, the method comprising the steps of:
- at the first signalling device:
  providing a retro-reflecting modulator having a telecentric lens, a modulator and a reflector; receiving a signal transmitted from said second signalling device; and
  modulating and reflecting the received signal back to the second signalling device, to transmit a modulated signal to the second signalling device; and
- at said second signalling device:
  generating a signal; transmitting the generated signal to the first signalling device; receiving the modulated signal from the first signalling device; and retrieving modulation data from the modulated signal.

84. A signalling system comprising first and second signalling devices, wherein:
- the first signalling device comprises a retro-reflecting modulator having a telecentric lens, a modulator and a reflector, and the retro-reflecting modulator being operable to receive a signal transmitted from said second signalling device and to modulate and reflect the received signal back to the second signalling device, to transmit a modulated signal to the second signalling device;
- wherein said second signalling device comprises:
  means for generating a signal; means for transmitting the generated signal to said first signalling device; means for receiving the modulated signal from said first signalling device; and means for retrieving modulation data from the modulated signal.

85. A system according to claim 84, wherein said reflector is optically located substantially at a back focal plane of said telecentric lens.

86. A system according to claim 85, wherein said reflector is physically located away from said back focal plane and further comprising an optical guide extending between said back focal plane and said reflector for optically locating said reflector substantially at said back focal plane.

87. A signalling system comprising first and second signalling devices, wherein:
- the first signalling device comprises: a telecentric lens for receiving a signal transmitted from the second signalling device; a modulator for modulating the received signal with modulation data for the second signalling device; and a reflector for reflecting the modulated signal back to the second signalling device;
- wherein said second signalling device comprises a signal generator operable to generate a signal; a transmitter operable to transmit the generated signal to the first signalling device; a receiver operable to receive the modulated signal from the first signalling device; and a processor operable to retrieve the modulation data from the modulated signal.

88. A system according to claim 87, wherein said reflector is optically located substantially at a back focal plane of said telecentric lens.

89. A system according to claim 88, wherein said reflector is physically located away from said back focal plane and further comprising an optical guide extending between said back focal plane and said reflector for optically locating said reflector substantially at said back focal plane.

90. A signalling device for use in a signalling system, the signalling device comprising:
- a retro-reflector having:
  a telecentric lens operable to focus signals received from a source; and a reflector operable to reflect said signals focussed by said telecentric lens back to said source.

91. A signalling device according to claim 90, further comprising a modulator operable to modulate the received signals with modulation data.

92. A signalling device according to claim 91, wherein said modulator is transmissive and is located between said telecentric lens and said reflector.

93. A signalling device according to claim 91, wherein said modulator is operable to modulate at least one of the amplitude, phase, frequency or polarisation of the received signals.

94. A signalling according to claim 91, wherein said modulator comprises a self electro-optic effect device.

95. A signalling device according to claim 91, wherein said modulator comprises an electro-optic modulator.

96. A signalling device according to claim 91, wherein said modulator comprises a liquid crystal modulator.

97. A signalling device according to claim 91, wherein said modulator comprises a semiconductor electro-optic device.

98. A signalling device according to claim 97, comprising a drive circuit for applying an electric drive signal to said semiconductor electro-optic device, the drive signal varying in dependence upon data to be transmitted to a remote signalling device.

99. A signalling device according to claim 98, wherein said drive circuit is operable to vary a bias voltage applied to said semiconductor electro-optic device in dependence upon the data to be transmitted to said remote signalling device.

100. A signalling device according to claim 91, operable to receive signals from a plurality of sources, and wherein said modulator is operable to apply the same modulation data to the signals received from each of said sources.

101. A signalling device according to claim 100, wherein the same modulator is used to modulate each of the received signals in a time multiplexed manner.

102. A signalling device according to claim 91, operable to receive signals from a plurality of sources and comprising a plurality of modulators each arranged to modulate the signal received from a respective one of said sources.

103. A signalling device according to claim 102, wherein said plurality of modulators are arranged in an ordered array.

104. A signalling device according to claim 90, further comprising a detector for detecting the received signal and a circuit operable to retrieve any message carried by the received signal.

105. A signalling device according to claim 90, further comprising a plurality of detectors for detecting the signal received from a plurality of different sources and a circuit operable to retrieve any messages modulated onto the received signals by the respective sources.

106. A signalling device according to claim 90, wherein said retro-reflector is operable to reflect the received signal back along a principal axis of the received signal.

107. A signalling device according to claim 90, wherein said reflector is physically located substantially at a back focal plane of said telecentric lens.

108. A signalling device according to claim 90, wherein said reflector is optically located substantially at a back focal plane of said telecentric lens.

109. A signalling device according to claim 108, wherein said reflector is physically located away from said back focal plane and further comprising an optical guide extending between said back focal plane and said reflector for optically locating said reflector substantially at said back focal plane.

* * * * *